US011066723B2

(12) United States Patent
Papouchado et al.

(10) Patent No.: US 11,066,723 B2
(45) Date of Patent: Jul. 20, 2021

(54) SYSTEMS AND METHODS TO CHEMICALLY TREAT METAL-BEARING WASTE STREAMS TO RECOVER VALUE-ADDED MATERIALS

(71) Applicant: Elixsys Inc., Bainbridge Island, WA (US)

(72) Inventors: Lucien Papouchado, Aiken, SC (US); Barry E. Scheetz, Lemont, PA (US); Joseph Preston, Bainbridge Island, WA (US)

(73) Assignee: Elixsys, Inc., Bainbridge Island, WA (US)

( * ) Notice: Subject to any disclaimer, the term of this patent is extended or adjusted under 35 U.S.C. 154(b) by 0 days.

(21) Appl. No.: 16/752,477

(22) Filed: Jan. 24, 2020

(65) Prior Publication Data

US 2020/0239978 A1    Jul. 30, 2020

Related U.S. Application Data

(63) Continuation-in-part of application No. 16/749,860, filed on Jan. 22, 2020.
(Continued)

(51) Int. Cl.
*C22B 3/02* (2006.01)
*C22B 3/10* (2006.01)
(Continued)

(52) U.S. Cl.
CPC ............... *C22B 3/10* (2013.01); *C01F 5/20* (2013.01); *C01F 7/34* (2013.01); *C01F 11/02* (2013.01);
(Continued)

(58) Field of Classification Search
CPC ........... C22B 7/006; C22B 3/02; C22B 59/00; C22B 3/44; C22B 3/10; C22B 7/007;
(Continued)

(56) References Cited

U.S. PATENT DOCUMENTS 4,057,512 A * 11/1977 Vadovic ................... B01J 23/92
502/5
4,092,401 A    5/1978 Dreulle
(Continued)

FOREIGN PATENT DOCUMENTS

AU          4319696 A  *  7/1996  ............... A62D 3/33
CN        103964480 A     8/2014
(Continued)

OTHER PUBLICATIONS

PCT/US2020/015102 International Search Report and Written Opinion, dated Apr. 20, 2020, 9 pages.
(Continued)

*Primary Examiner* — Timothy C Vanoy
(74) *Attorney, Agent, or Firm* — Polsinelli PC

(57) ABSTRACT

Disclosed herein are system and methods to effectively leach coal ash with hydrochloric acid and separate an insoluble silica product and then selectively precipitate, from the leachate, a number to value-added, strategic, marketable products using a hydroxide reagent. The resulting precipitated products include iron, aluminum, magnesium, calcium, and a mixture of rare earth elements and transition metals. These can be separated as hydroxides or converted to oxides or carbonates. Using hydrochloric acid for leaching and converting the chloride to sodium chloride in the final step results in practically no waste for this process. The silica can be further purified using sodium hydroxide fusion or caustic leach methods and some minor streams from this process are recycled to minimize any waste stream. These systems and
(Continued)

methods can be applied to a number of other industrial waste products such as red mud from the aluminum process, slag from steel furnaces, mine tailings, and other metal-bearing waste streams.

14 Claims, 34 Drawing Sheets

Related U.S. Application Data

(60) Provisional application No. 62/796,541, filed on Jan. 24, 2019, provisional application No. 62/796,549, filed on Jan. 24, 2019, provisional application No. 62/796,550, filed on Jan. 24, 2019, provisional application No. 62/810,066, filed on Feb. 25, 2019, provisional application No. 62/824,523, filed on Mar. 27, 2019, provisional application No. 62/878,542, filed on Jul. 25, 2019.

(51) Int. Cl.
  *C22B 59/00* (2006.01)
  *C01F 5/20* (2006.01)
  *C01F 7/34* (2006.01)
  *C01F 11/02* (2006.01)
  *C01G 49/02* (2006.01)

(52) U.S. Cl.
  CPC .............. *C01G 49/02* (2013.01); *C22B 3/02* (2013.01); *C22B 59/00* (2013.01)

(58) Field of Classification Search
  CPC .... C22B 7/008; C01F 3/02; C01F 7/34; C01F 5/08; C01F 11/181; C01F 17/206; C01F 11/02; C01F 5/22; C01F 7/441; C01G 49/06; C01G 49/02; C01B 32/55; C01B 33/12; C01D 3/04; A62D 3/30; A62D 3/36; A62D 2101/08; A62D 2101/43
  See application file for complete search history.

(56) References Cited

U.S. PATENT DOCUMENTS

| | | | |
|---|---|---|---|
| 4,121,945 A | 10/1978 | Hurst et al. | |
| 4,252,777 A | 2/1981 | McDowell et al. | |
| 5,403,496 A * | 4/1995 | Kramer | A62D 3/33 210/912 |
| 6,022,406 A * | 2/2000 | Roux | C09D 5/084 106/419 |
| 6,027,708 A | 2/2000 | Rayalu et al. | |
| 6,074,458 A | 6/2000 | Bittner et al. | |
| 7,837,961 B2 | 11/2010 | Boudreault et al. | |
| 7,871,583 B2 | 1/2011 | Jinguo et al. | |
| 8,241,594 B2 | 8/2012 | Boudreault et al. | |
| 9,181,603 B2 | 11/2015 | Boudreault et al. | |
| 9,315,382 B2 | 4/2016 | Chaifetz et al. | |
| 9,382,600 B2 | 7/2016 | Boudreault et al. | |
| 9,410,227 B2 | 8/2016 | Boudreault et al. | |
| 9,534,274 B2 | 1/2017 | Boudreault et al. | |
| 9,556,500 B2 | 1/2017 | Boudreault et al. | |
| 10,626,482 B2 * | 4/2020 | Peterson | C22B 3/12 |
| 10,718,036 B2 * | 7/2020 | Hajiani | C22B 34/24 |
| 2003/0010156 A1 * | 1/2003 | Tedjar | C22B 19/24 75/751 |
| 2007/0224109 A1 | 9/2007 | Chaifetz et al. | |
| 2016/0185597 A1 | 6/2016 | Chaifetz et al. | |
| 2018/0265948 A1 | 9/2018 | Laudal et al. | |
| 2018/0363098 A1 * | 12/2018 | Huang | C22B 3/44 |
| 2019/0153562 A1 * | 5/2019 | Wang | C01F 11/02 |
| 2020/0002784 A1 * | 1/2020 | Peterson | C22B 7/008 |

FOREIGN PATENT DOCUMENTS

| | | | | |
|---|---|---|---|---|
| CN | 105671304 A | | 6/2016 | |
| CN | 105087934 B | | 5/2018 | |
| DE | 2700718 A1 | | 7/1977 | |
| KR | 2020032663 A | * | 3/2020 | ............ C01D 15/08 |
| WO | WO 96/19304 A1 | * | 6/1996 | ............... A62D 3/33 |
| WO | 2013/037054 A1 | | 3/2013 | |
| WO | 2013/104059 A1 | | 7/2013 | |
| WO | 2013/142957 A1 | | 10/2013 | |
| WO | 2014/008586 A1 | | 1/2014 | |
| WO | 2016/023054 A1 | | 2/2016 | |
| WO | WO 2016/051098 A1 | * | 4/2016 | ............... A62D 3/36 |

OTHER PUBLICATIONS

PCT Translation of CN 105671304 A, Jun. 15, 2016, 10 pages.
PCT Translation of CN 105087934 B, May 15, 2018, 18 pages.
Shcherban, "Ash Utilization With Silica and Metals Recovery", The International Association of Sciences, Inc., pp. 1138-1142; Dec. 31, 1996.
Yao et al., "A review of the alumina recovery from coal fly ash, with a focus in China", Fuel; Mar. 15, 2014, pp. 74-85, vol. 120.
Bal et al., "Thermal decomposition of coal fly ash by concentrated sulfuric acid and alumina extraction process based on it", Fuel Processing Technology, Manuscript Draft, Manuscript Number: FUPROC-D-10-00083, Department of Chemistry, College of Science, Xian University of Architecture & Technology, Xian, 710055 China; Jun. 2011.
Sumitomo Chemical, Product Databook, Dec 2015; 14 pgs.
Calcium Chloride, A Guide to Physical Properties, Occidental Chemical Corporation; First published Sep. 5, 2014; pp. 1-9.
Calcium Chloride Handbook, A Guide to Properties, Forms, Storage and Handling, Dow Chemical Company, Aug. 2003; pp. 1-28.
Fenelonov et al., "The Properties of Cenospheres and the Mechanism of Their Formation During High-Temperature coal Combustion at Thermal Power Plans", KONA Powder and Particle Journal No. 28, 2010, pp. 189-208.
Tolhurst, "Commercial Recovery of Metals from Coal Ash", 2015 World of Coal Ash (WOCA) Conference in Nashville, TN—May 5-7, 2015, 9 pgs.
Liu et al., "Extraction of Aluminum from Coal Fly Ash by Alkali Activation with Microwave Heating", Journal of Residuals Science & Technology, 2016, pp. S181-S187, vol. 13, Supplement 1.
Renew et al., "Impact of Salt on Metal Leaching From Coal Fly Ash", 2015 World of Coal Ash (WOCA) Conference in Nashville, TN—May 7, 2015, 25 pgs.
Ferrarini et al., "Integrated Synthesis of Zeolites Using Coal Fly Ash: Element Distribution in the Products, Washing Waters and Effluent", J. Braz. Chem. Soc., 2016, pp. 2034-2045, vol. 27, No. 11.
Izquierdo et al., "Leaching behaviour of elements from coal combustion fly ash: an overview", May 2012; pp. 1-34.
Li et al., "An Efficient Approach for Lithium and Aluminum Recovery from Coal Fly Ash by Pre-Desilication and Intensified Acid Leaching Processes", Metals, 2017, pp. 1-12, vol. 7, 272.
Lokeshappa et al., "Single Step Extractions of Metals in Coal Fly Ash", Resources and Environment, 2012, pp. 1-8, vol. 2, No. 2.
Duke Energy Coal Combustion Product Management Study, Phase 3—Alternative and Innovative Technologies, Final Report, May 2016, Electric Power Research Institute, 77 pgs.
Gray et al., "Physical Cleaning of High Carbon Fly Ash", Apr. 20, 2002; 14 pgs.
Sedres, "Recovery of Si02 and Al203 from coal fly ash", A thesis submitted in fulfilment of the requirements for the degree of Magister Scientiae in the Department of Chemistry, University of Western Cape, May 2016, 161 pgs.
Murtha et al., "Recovery of Alumina From Coal Fly Ash by High Temperature Chlorination", Proceedings of the Iowa Academy of Science, 1976, pp. 125-129, vol. 83, No. 4, Art. 4.
Scheetz, "Chemistry and Mineralogy of Coal Fly Ash: Basis for Beneficial Use", Materials Research Institute, The Pennsylvania State University, Jan. 2004; pp. 1-10.

(56) References Cited

OTHER PUBLICATIONS

DD-6 Activated Alumina Fluoride and Arsenic Removal, BASF The Chemical Company, 2006, 1 page.

* cited by examiner

| Ash Feedstock Bulk % Composition Major Earth Forming Oxides | | |
|---|---|---|
| Major Oxides | Class F | Class C |
| $SiO_2$ | 35.1 | 26.2 |
| $Al_2O_3$ | 18.1 | 16.4 |
| $Fe_2O_3$ | 16 | 8.15 |
| MgO | 1.1 | 6.28 |
| CaO | 13.3 | 25.7 |
| $Na_2O$ | 1.11 | 2.73 |
| $K_2O$ | 1.3 | 0.67 |

Fig. 5

Ash Feedstock Composition
Major, Minor, and Trace Metals

| Analyte (%) | Class F Ash | Class C Ash |
|---|---|---|
| SiO$_2$ | 35.1 | 26.2 |
| Al$_2$O$_3$ | 18.1 | 16.4 |
| Fe$_2$O$_3$ | 16 | 8.15 |
| MgO | 1.1 | 6.28 |
| CaO | 13.3 | 25.7 |
| Na$_2$O | 1.11 | 2.73 |
| K$_2$O | 1.31 | 0.67 |
| TiO$_2$ | 0.91 | 1.37 |
| P$_2$O$_5$ | 0.33 | 1.8 |
| MnO | 0.03 | 0.02 |
| Cr$_2$O$_3$ | 0.01 | 0.01 |
| V$_2$O$_5$ | 0.03 | 0.04 |
| LOI | 10 | 3.55 |
| Sum | 97.3 | 92.9 |
| C(t) | 4.74 | 2.49 |
| S | 1.59 | 2.09 |

| Analyte (g/t) | Class F Ash | Class C Ash |
|---|---|---|
| La | 47 | 65 |
| Ce | 98 | 124 |
| Pr | 11.9 | 13.5 |
| Nd | 45 | 56 |
| Sm | 10.2 | 11.6 |
| Eu | 1.9 | 2.9 |
| Gd | 9 | 10 |
| Tb | 1.6 | 1.5 |
| Dy | 7.5 | 9.1 |
| Ho | 1.6 | 1.8 |
| Y | 43.6 | 46 |
| Er | 4.2 | 5.6 |
| Tm | 0.7 | 0.9 |
| Yb | 5.7 | 4.7 |
| Lu | 1 | 0.7 |
| Sc | <25 | <25 |
| Th | 17.8 | 23.6 |
| U | 5.6 | 9.8 |

| Analyte (g/t) | Class F Ash | Class C Ash |
|---|---|---|
| Ag | <2 | <2 |
| As | <100 | <30 |
| Ba | 1370 | 7890 |
| Be | 6.97 | 4.25 |
| Bi | <20 | <20 |
| Cd | <2 | <4 |
| Co | 28 | 43 |
| Cu | 68.2 | - |
| Li | 74 | 8 |
| Mo | <9 | <30 |
| Ni | 61 | 109 |
| Pb | <60 | 102 |
| Sb | <10 | <10 |
| Se | <30 | <60 |
| Sn | <20 | <50 |
| Sr | 1750 | 3360 |
| Ti | <30 | <30 |
| Zn | 105 | 275 |

Fig. 6

Mineralogical Compositions of the Ash Feedstocks
Semi-quantitative XRD

| Formula | Mineral | Class F Ash (wt %) | Class C Ash (wt %) |
|---|---|---|---|
| $SiO_2$ | Quartz | 12.6 | 7.3 |
| $SiO_2$ | Tridymite | 5.7 | - |
| $Al_6Si_2O_{13}$ | Mullite | 18.5 | 11.4 |
| $NaAlSi_3O_8$ | Albite | 10.0 | 13.3 |
| $KAlSi_3O_8$ | Microcline | 8.1 | 2.9 |
| $(Al_2Si_2)_5(OH)_4$ | Kaolinite | - | 7.4 |
| $Fe_2O_3$ | Hematite | 6.2 | 2.5 |
| $FeCl_3$ | Iron Chloride | - | 8.2 |
| $\gamma\text{-}Fe_2O_3$ | Maghemite | 8.0 | - |
| $FeCO_3$ | Siderite | 3.4 | - |
| $FeTiO_3$ | Ilmenite | - | 2.1 |
| $CaSO_4$ | Anhydrite | 6.8 | 15.2 |
| $CaCO_3$ | Calcite | 3.2 | - |
| $Ca_5(PO_4)_3OH$ | Hydroxylapatite | - | 3.5 |
| $CaO$ | Calcium Oxide | - | 13.2 |
| $Ca(OH)_2$ | Portlandite | 10.5 | - |
| $CaO$ | Lime | - | 1.7 |
| $CaMg(CO_3)_2$ | Dolomite | 3.1 | - |
| $MgO$ | Periclase | - | 5.7 |
| $Ba(Sr)SO_4$ | Barite, Strontian | - | 1.6 |
| $C$ | Graphite | 3.0 | 2.4 |
| $TiO_2$ | Anatase | 0.9 | - |
| $NaCl$ | Halite | - | 1.7 |
| | TOTAL | 100 | 100 |

Fig. 7

| Leaching Results (6 hrs) 3:1 6N HCl / 6N HNO₃ (14% Solids) | | |
|---|---|---|
| Element | Class F % Extract | Class C % Extract |
| Si | 0 | 0 |
| Al | 67 | 92 |
| Fe | 88 | 93 |
| Mg | 86 | 94 |
| Ca | 95 | 89 |
| Na | 72 | 84 |
| K | 61 | 72 |
| Ti | 49 | 8 |
| P | 88 | 51 |
| Mn | 81 | 90 |
| TREE | 75 | 88 |
| C(t) | 1 | 2 |
| S(t) | 72 | 17 |

Fig. 8

| Leaching Results (6 hrs) 6N H₂SO₄ + 0.006N NaF (14% Solids) | | |
|---|---|---|
| Element | Class F % Extract | Class C % Extract |
| Si | 0 | 1 |
| Al | 50 | 91 |
| Fe | 52 | 89 |
| Mg | 76 | 92 |
| Ca | 3 | 2 |
| Na | 58 | 79 |
| K | 45 | 67 |
| Ti | 37 | 81 |
| P | 80 | 96 |
| Mn | 68 | 83 |
| TREE | 12 | 3 |
| C(t) | 1 | 2 |
| S(t) | 88 | 75 |

Fig. 9

| Leaching Results (6 hrs) 6N H₂SO₄ + 0.05% CaF₂ (14% Solids) | | |
|---|---|---|
| Element | Class F % Extract | Class C % Extract |
| Si | 0 | 1 |
| Al | 56 | 87 |
| Fe | 56 | 85 |
| Mg | 79 | 89 |
| Ca | 2 | 2 |
| Na | 60 | 78 |
| K | 49 | 69 |
| Ti | 45 | 80 |
| P | 80 | 92 |
| Mn | 69 | 83 |
| TREE | 11 | 4 |
| C(t) | | |
| S(t) | 87 | 73 |

Fig. 10

| Leaching Results HCl 1.5 pH then 11% HCl (4hr each stage) | | |
| --- | --- | --- |
| Element | Class F % Extract | Class C % Extract |
| Si | 0 | 0 |
| Al | 37 | 94 |
| Fe | 57 | 92 |
| Mg | 68 | 96 |
| Ca | 93 | 97 |
| Na | 42 | 87 |
| K | 4 | 83 |
| Ti | 27 | 6 |
| P | 81 | 54 |
| Mn | 83 | 90 |
| TREE | 49 | 78 |
| C(t) | 18 | 3 |
| S(t) | 93 | 91 |

Fig. 11

| Leaching Results HCl 1.5 pH then 30% HCl (4hr each stage) | | |
| --- | --- | --- |
| Element | Class F % Extract | Class C % Extract |
| Si | 5 | 0 |
| Al | 55 | 92 |
| Fe | 88 | 93 |
| Mg | 81 | 94 |
| Ca | 94 | 94 |
| Na | 60 | 83 |
| K | 53 | 75 |
| Ti | 43 | 35 |
| P | 90 | 67 |
| Mn | 77 | 90 |
| TREE | 66 | 85 |
| C(t) | 1 | 5 |
| S(t) | 33 | 66 |

Fig. 12

| Leaching Results 30% HCl 24hrs | |
|---|---|
| Element | Class C % Extract |
| Si | 0 |
| Al | 95 |
| Fe | 98 |
| Mg | 98 |
| Ca | 97 |
| Na | 86 |
| K | 79 |
| Ti | 47 |
| P | 73 |
| Mn | 99 |
| TREE | 91 |
| C(t) | 7 |
| S(t) | 83 |

Fig. 13

| Composition | Class C Residue (wt %) | Class F Residue (wt %) |
| --- | --- | --- |
| NaAlSi$_3$O$_8$ | 7.2 | 16.7 |
| BaSO$_4$ | - | 6.5 |
| TiO$_2$ | 0.9 | - |
| CaCO$_3$ | 1.5 | - |
| CaMg(CO$_3$) | 2.5 | - |
| C | 8.1 | 5.9 |
| Fe$_2$O$_3$ | 7.3 | 3.1 |
| Ca$_5$(PO$_4$)$_3$OH | - | 9.8 |
| FeTiO$_3$ | - | 2.7 |
| Fe$_3$O$_4$ | 4.0 | - |
| ~Al$_6$Si$_3$O$_{15}$ | 25.4 | 1.0 |
| KAlSi$_3$O$_8$ | 7.2 | 4.9 |
| SiO$_2$ | 35.7 | 49.6 |
| | 100 | 100 |

Fig. 17

% Composition of Precipitate Hydroxides at Different pHs

| pH 3 | | pH 4 | | pH 5-8 | | pH 9 | | pH 10 | | pH 11 | | pH 13 | |
|---|---|---|---|---|---|---|---|---|---|---|---|---|---|
| Fe | 87.500 | Al | 88.53 | Al | 56.36 | Mn | 71.8 | Mg | 75.4 | Mg | 100 | Ca | 100 |
| Al | 6.700 | Fe | 4.01 | Mg | 11.05 | Ni | 14.1 | Ca | 24.6 | | | | |
| pH 3 | 4.800 | Na | 3.57 | Ce | 7.22 | La | 8.7 | | | | | | |
| Ti | 0.379 | Mg | 1.83 | Zn | 6.08 | Zn | 5.4 | | | | | | |
| V | 0.372 | Ca | 1.27 | Nd | 3.59 | | | | | | | | |
| Cr | 0.120 | P | 0.40 | Pb | 3.32 | | | | | | | | |
| Mo | 0.065 | Zn | 0.20 | Y | 3.07 | | | | | | | | |
| Sc | 0.023 | K | 0.07 | Mn | 2.98 | | | | | | | | |
| Th | 0.007 | Ni | 0.06 | La | 1.85 | | | | | | | | |
| U | 0.007 | V | 0.02 | Pr | 0.87 | | | | | | | | |
| | | Sr | 0.02 | Ni | 0.77 | | | | | | | | |
| | | Y | 0.02 | Sm | 0.64 | | | | | | | | |
| | | Li | 0.02 | Gd | 0.60 | | | | | | | | |
| | | U | 0.01 | Dy | 0.46 | | | | | | | | |
| | | Ce | 0.01 | Cu | 0.33 | | | | | | | | |
| | | Nd | 0.01 | Er | 0.22 | | | | | | | | |
| | | Co | 0.01 | Yb | 0.18 | | | | | | | | |
| | | Cr | 0.01 | Eu | 0.14 | | | | | | | | |
| | | Mo | 0.01 | Fe | 0.11 | | | | | | | | |
| | | | | Ho | 0.09 | | | | | | | | |
| | | | | Tb | 0.06 | | | | | | | | |
| | | | | Ag | 0.01 | | | | | | | | |

Fig. 21

Final Product Stream Composition

| Cations | mg/L | Anions |
|---|---|---|
| Al | 0.3 | Chloride |
| Cations | | |
| Na | 53,000 | |
| K | 363 | |
| Ba | 2.23 | |
| Sr | 151 | |

Fig. 29

| Test # | P19 | | P21 | | P22 | | P23 | | P32 | |
|---|---|---|---|---|---|---|---|---|---|---|
| PPt weight | 17g | | 50g | | 5g | | 8g | | | |
| pH & % | 2.5 | % | 4 | % | 9 | % | 11 | % | Na₂CO₃ | % |
| Al | 1.28 | 3.45 | 19.0 | 72.5 | 6.54 | 17.68 | 0.15 | 0.37 | 0.0 | 0.03 |
| Fe | 32.5 | 87.58 | 0.50 | 1.9 | 2.51 | 6.79 | 0.06 | 0.15 | 0.0 | 0.02 |
| Mg | 1.04 | 2.80 | 0.65 | 2.5 | 25.10 | 67.86 | 37.1 | 91.83 | 0.0 | 0.02 |
| Ca | 0.44 | 1.18 | 5.52 | 21.1 | 1.30 | 3.51 | 2.91 | 7.20 | 38.5 | 99.03 |
| Na | 0.04 | 0.11 | 0.33 | 1.3 | 0.08 | 0.23 | 0.08 | 0.19 | 0.3 | 0.74 |
| K | 0.03 | 0.08 | 0.09 | 0.3 | 0.01 | 0.03 | 0.02 | 0.05 | 0.0 | 0.03 |
| P | 1.74 | 4.69 | <0.04 | 0.2 | 0.02 | 0.06 | 0.01 | 0.03 | 0.0 | 0.03 |
| Mn | 0.01 | 0.02 | 0.003 | 0.0 | 0.37 | 1.00 | 0.005 | 0.01 | 0.0 | 0.03 |
| TREE | 0.02 | | 0.03 | | 0.53 | 1.43 | 0.02 | 0.05 | | |
| La-Sm | 0.01 | | 0.03 | | 0.41 | | 0.02 | | | |
| Eu-Lu,Y | 0.00 | | 0.01 | | 0.12 | | 0.00 | | | |
| TOTALS | 37.11 | | 26.2 | | 36.99 | | 40.37 | | 38.9 | |

Fig. 31

SYSTEMS AND METHODS TO CHEMICALLY TREAT METAL-BEARING WASTE STREAMS TO RECOVER VALUE-ADDED MATERIALS

RELATED APPLICATIONS

The present application claims priority to U.S. Patent App. No. 62/796,541, entitled Systems and Methods to Treat Flue Gas Desulfurization (FGD) Waste to Produce High Purity Ammonium Sulfate and Calcium Carbonate Products, filed Jan. 24, 2019, U.S. Patent App. No. 62/796,549, entitled Systems and Methods to Chemically Treat Metal-bearing Waste Streams to Recover Value-added Materials, filed Jan. 24, 2019, U.S. Patent App. No. 62/796,550, entitled Systems and Methods to Chemically Treat Metal-bearing Waste Streams to Recover Value-added Materials, filed Jan. 24, 2019, U.S. Patent App. No. 62/810,066, entitled Removal of Chloride from Flue Gas Desulfurization Feed, filed Feb. 25, 2019, U.S. Patent App. No. 62/824,523, entitled Reducing the Cost of Reagents for Treating Metal Bearing Wastes, filed Mar. 26, 2019, U.S. Patent App. No. 62/878,542, entitled Systems and Methods for Pretreatment of Feedstocks Comprising Sulfites, filed Jul. 24, 2019, and U.S. patent application Ser. No. 16/749,860 entitled Systems and Methods to Treat Flue Gas Desulfurization Waste to Produce High Purity Ammonium Sulfate and Calcium Carbonate Products, filed Jan. 22, 2020, which are herein incorporated by reference in their entirety.

COPYRIGHT NOTICE

Contained herein is material that is subject to copyright protection. The copyright owner has no objection to the facsimile reproduction by anyone of the patent document or the patent disclosure, as it appears in the United States Patent and Trademark Office patent file or records, but otherwise reserves all rights to the copyright whatsoever. The following notice applies to the software, screenshots and data as described below and in the drawings hereto and All Rights Reserved.

TECHNICAL FIELD

This disclosure relates generally to the hydrometallurgy field and more specifically to chemical treatment of coal combustion products, and other industrial wastes, to produce value-added, marketable products while simultaneously minimizing or eliminating a resultant waste stream.

BACKGROUND

Coal combustion products (CCP) comprise fly ash (fine particulates collected in electrostatic precipitators), a lime or limestone absorption spray tower to separate out sulfur oxide ($SO_x$) gases, and bottom ash remaining behind after coal combustion. The lime or limestone in the absorption bed reacts with the $SO_x$ gases resulting in calcium sulfite (hannabeckite, $CaSO_3.0.5H_2O$). The calcium sulfite is often oxidized to calcium sulfate, which is referred to as flue gas desulfurization (FGD) gypsum. In some coal plants, the calcium sulfite/sulfate byproduct is separate from the other byproducts while in others it is mixed in with the ash.

Currently, the primary applications of the calcium sulfate ($CaSO_4$) or FGD gypsum are in the wallboard industry and as a soil amendment. The fly ash commonly goes into the construction industry as a cement additive. However, significant portions of the FGD gypsum and ashes are not marketable, are stored in piles and ponds, and present a plethora of environmental issues.

Many efforts have focused on tackling specific parts of CCPs such as efforts to convert calcium sulfate to ammonium sulfate fertilizer and calcium carbonate filler. Others have attempted to extract specific elements out of the CCPs, such as aluminum or rare earth elements, discarding the remainder. To date there has not been a successful effort to treat the entire inventory and convert it to value-added, marketable products with minimal or no waste. That is the focus of this disclosure.

SUMMARY

Disclosed herein are systems and methods for processing a metal-bearing waste streams In some embodiments, the feedstock is a powder that comprises metal-bearing components and sulfur components. The feedstock may be loaded into a first reactor to begin processing. In some embodiments, a processor is configured to operate a processing sequence comprising at least one of a dissolution process and a precipitation process wherein the dissolution process and/or precipitation process take place in one or more reactors. The processor may configured to perform generally one or more of the following steps: a leach process performed by at least one of contacting, passing, and percolating an acid through the feedstock and collecting a leachate; responsive to collecting the leachate, use a sequential selective precipitation process at a predetermined pH to sequentially precipitate components, wherein a first predetermined pH is used to precipitate a first component from the leachate; and using the sequential precipitation process to separate additional components based on the predetermined pHs of the component of interest. In some embodiments, the processor is configured to use a predetermined pH to separate components from the leachate based on predetermined logic.

Applicant(s) herein expressly incorporate(s) by reference all of the following materials identified in each paragraph below. The incorporated materials are not necessarily "prior art".

U.S. patent application Ser. No. 15/669,870, entitled System and Method for Distributed Trading Platform, filed Aug. 4, 2017, herein incorporated by reference in its entirety.

U.S. patent application Ser. No. 15/675,697, entitled Systems and Methods for Using Smart Contracts to Control the Trade, Supply, Manufacture, and Distribution of Commodities, filed Aug. 11, 2017, herein incorporated by reference in its entirety.

If it is believed that any of the above-incorporated material constitutes "essential material" within the meaning of 37 CFR 1.57(d)(1)-(3), applicant(s) reserve the right to amend the specification to expressly recite the essential material that is incorporated by reference as allowed by the applicable rules.

Aspects and applications presented here are described below in the drawings and detailed description. Unless specifically noted, it is intended that the words and phrases in the specification and the claims be given their plain and ordinary meaning to those of ordinary skill in the applicable arts. The inventors are aware that they can be their own lexicographers if desired. The inventors expressly elect, as their own lexicographers, to use only the plain and ordinary meaning of terms in the specification and claims unless they clearly state otherwise and expressly set forth the "special" definition of that term. Absent such clear statements of intent to apply a "special" definition, it is the inventors' intent and desire that the simple, plain, and ordinary meaning to the terms be applied to the interpretation of the specification and claims.

Further, the inventors are informed of the standards and application of the special provisions of 35 U.S.C. § 112(f). Thus, the use of the words "function," "means", or "step" in the Detailed Description or Description of the Drawings or claims is not intended to somehow indicate a desire to invoke the special provisions of 35 U.S.C. § 112(f) to define the systems, methods, processes, and/or apparatuses disclosed herein. To the contrary, if the provisions of 35 U.S.C. § 112(f) are sought to be invoked to define the embodiments, the claims will specifically and expressly state the exact phrases "means for" or "step for" and will also recite the word "function" (i.e., will state "means for performing the function of . . . "), without also reciting in such phrases any structure, material, or act in support of the function. Thus, even when the claims recite a "means for performing the function of . . . " or "step for performing the function of . . . ", if the claims also recite any structure, material, or acts in support of that means or step, then it is the clear intention of the inventors not to invoke the provisions of 35 U.S.C. § 112(f). Moreover, even if the provisions of 35 U.S.C. § 112(f) are invoked to define the claimed embodiments, it is intended that the embodiments not be limited only to the specific structures, materials, or acts that are described in the preferred embodiments, but in addition, include any and all structures, materials, or acts that perform the claimed function as described in alternative embodiments or forms, or that are well known present or later-developed equivalent structures, materials, or acts for performing the claimed function.

BRIEF DESCRIPTION OF THE DRAWINGS

A more complete understanding of the systems, methods, processes, and/or apparatuses disclosed herein may be derived by referring to the detailed description when considered in connection with the following illustrative figures. In the figures, like-reference numbers refer to like-elements or acts throughout the figures.

FIG. 5 is a table depicting the major earth forming oxides of a class F and a class C ash feedstock used in preliminary testing of the ash conversion process.

FIG. 6 is a table depicting the major, minor, and trace elemental composition of the class F and class C ash feedstocks used in preliminary testing of the ash conversion process.

FIG. 7 is a table depicting mineralogical composition of the class F and class C ash feedstocks used in preliminary testing of the ash conversion process.

FIG. 8 is a table depicting leaching results of class F and class C ash feedstocks using 3:1 hydrochloric acid to nitric acid.

FIG. 9 is a table depicting leaching results of class F and class C ash using sulfuric acid and sodium fluoride.

FIG. 10 is a table depicting leaching results of class F and class C ash feedstock using sulfuric acid and calcium fluoride.

FIG. 11 is a table depicting leaching results of class F and class C ash feedstock using hydrochloric acid in two stages starting with hydrochloric acid to pH 1.5 followed by 11% hydrochloric acid.

FIG. 12 is a table depicting leaching results of class F and class C ash feedstock using hydrochloric acid in two stages starting with hydrochloric acid to pH 1.5 followed by 30% hydrochloric acid.

FIG. 13 is a table depicting leaching results of class C ash feedstock using 30% hydrochloric acid for 24 hours on the residue after leaching in FIG. 12.

FIG. 17 depicts X-ray Diffraction (XRD) mineralogical compositions of class C and class F leach residues resulting from FIGS. 11 and 12 leaches.

FIG. 21 is a table depicting the percent composition of precipitate hydroxides at different pHs for class C ash feedstock.

FIG. 29 is a table depicting cations and anion for the sodium chloride final stream anions for class C ash feedstock.

FIG. 31 is a table showing results from lime precipitation testing.

Figure 1:
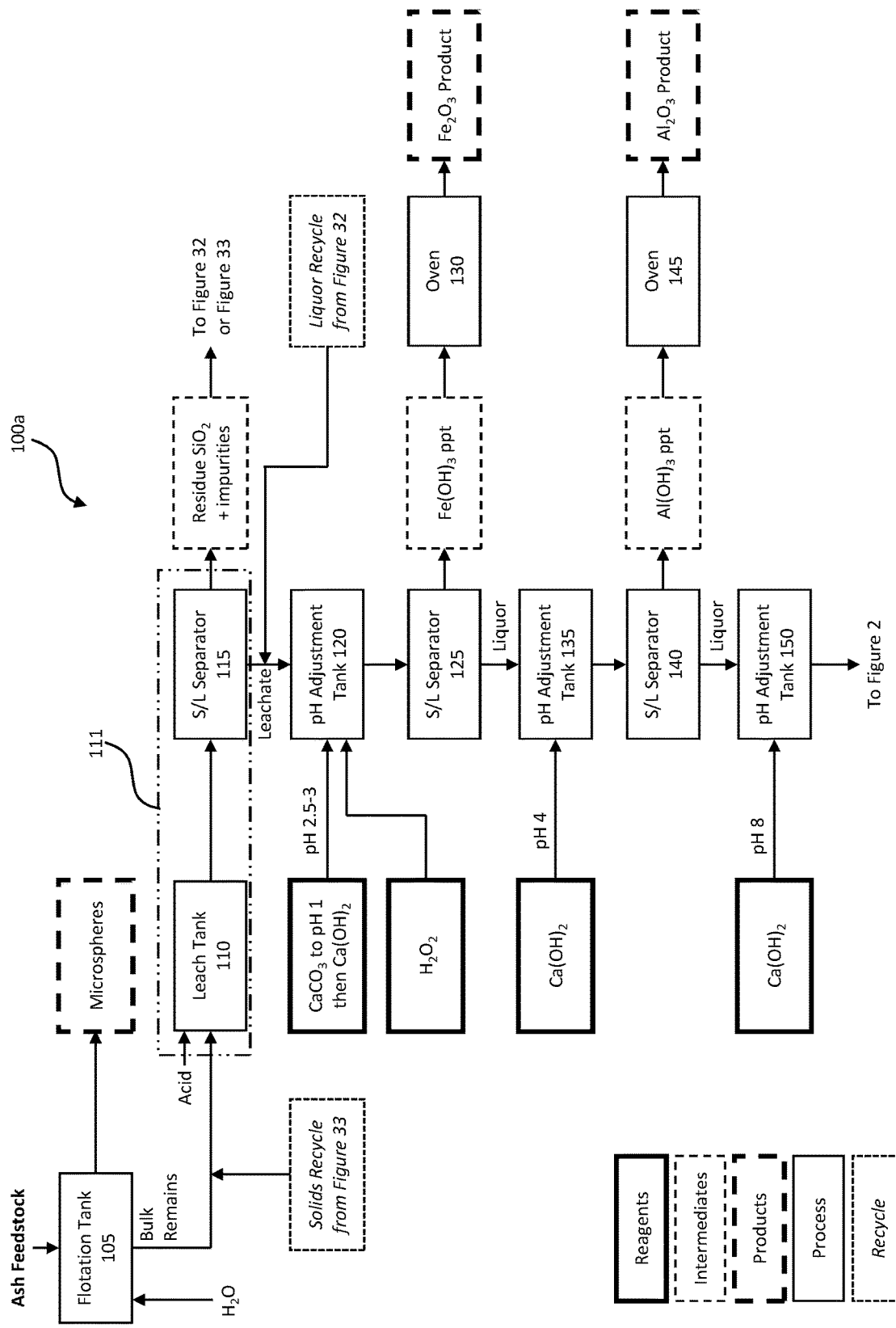
FIG. 1 depicts a lime embodiment of an ash conversion system and process.

Elements and acts in the figures are illustrated for simplicity and have not necessarily been rendered according to any particular sequence or embodiment.

DETAILED DESCRIPTION

Although the disclosure described herein is susceptible to various modifications and alternative iterations, specific embodiments thereof have been described in greater detail herein. It should be understood, however, that the detailed description of the systems and methods is not intended to limit the disclosure to the specific embodiments disclosed. Rather, it should be understood that the disclosure is intended to cover modifications, equivalents, and alternatives falling within the spirit and scope of the disclosure. In the following description, and for the purposes of explanation, numerous specific details, process durations, and/or specific formula values are set forth in order to provide a thorough understanding of the various aspects of exemplary embodiments. However, it will be understood by those skilled in the relevant arts that the apparatus, systems, and methods herein may be practiced without all of these specific details, process durations, and/or specific formula values. It should be noted that there are different and alternative configurations, devices, and technologies to which the disclosed embodiments may be applied. The full scope of the embodiments is not limited to the examples that are described below.

In the following examples of the illustrated embodiments, references are made to the accompanying drawings which form a part hereof, and in which is shown by way of illustration various embodiments in which the systems, methods, processes, and/or apparatuses disclosed herein may be practiced. It is to be understood that other embodiments may be utilized and structural and functional changes may be made without departing from the scope.

Headings are for organizational purposes only and are not intended to be limiting. Embodiments described under the various headings herein are interoperable with embodiments under other headings.

Overview

Described herein are systems and methods for generating valuable products from coal ash with near-zero waste. The systems and methods disclosed herein are unique in that they are the first demonstrated systems and methods that can convert coal ash feedstock (and other metal-bearing feedstocks) into marketable products of high value with near-zero waste.

The ash conversion process begins with a leach process. A leach process, in some embodiments, involved contacting, passing, and/or percolating an acid through a feedstock. In some embodiments, the leach process may be performed in one or more stages using one or more different acids or different concentrations of the same acids. In an exemplary embodiment, the leach process is performed in two-stages using different concentrations of hydrochloric acid.

In some embodiments, elements and/or compounds in leachate resulting from the leach process in the ash conversion process may then be further separated by selective precipitation at one or more different pHs. pH adjustments may be made to the leachate using a base such as calcium hydroxide (lime) or sodium hydroxide (caustic), or both in separate steps. Potassium and ammonium hydroxides are other possible bases that may be utilized for pH adjustment of the leachate. After each precipitation, the precipitate is separated by filtration and the filtrate proceeds to the next pH adjustment and precipitation. In some embodiments, one or more of hydroxides of iron, aluminum, mischmetals (rare earth elements (REEs) and transition metals), magnesium, and calcium may be separated sequentially. In some embodiments, the separations are quite clean and high purities (greater than 90%) may be obtained. Depending on the base(s) used in pH adjustments to the leachate, the final liquor at the end of the ash conversion process may comprise clean sodium chloride, resulting in near-zero waste streams.

Ash Conversion Systems and Methods

Figure 2:
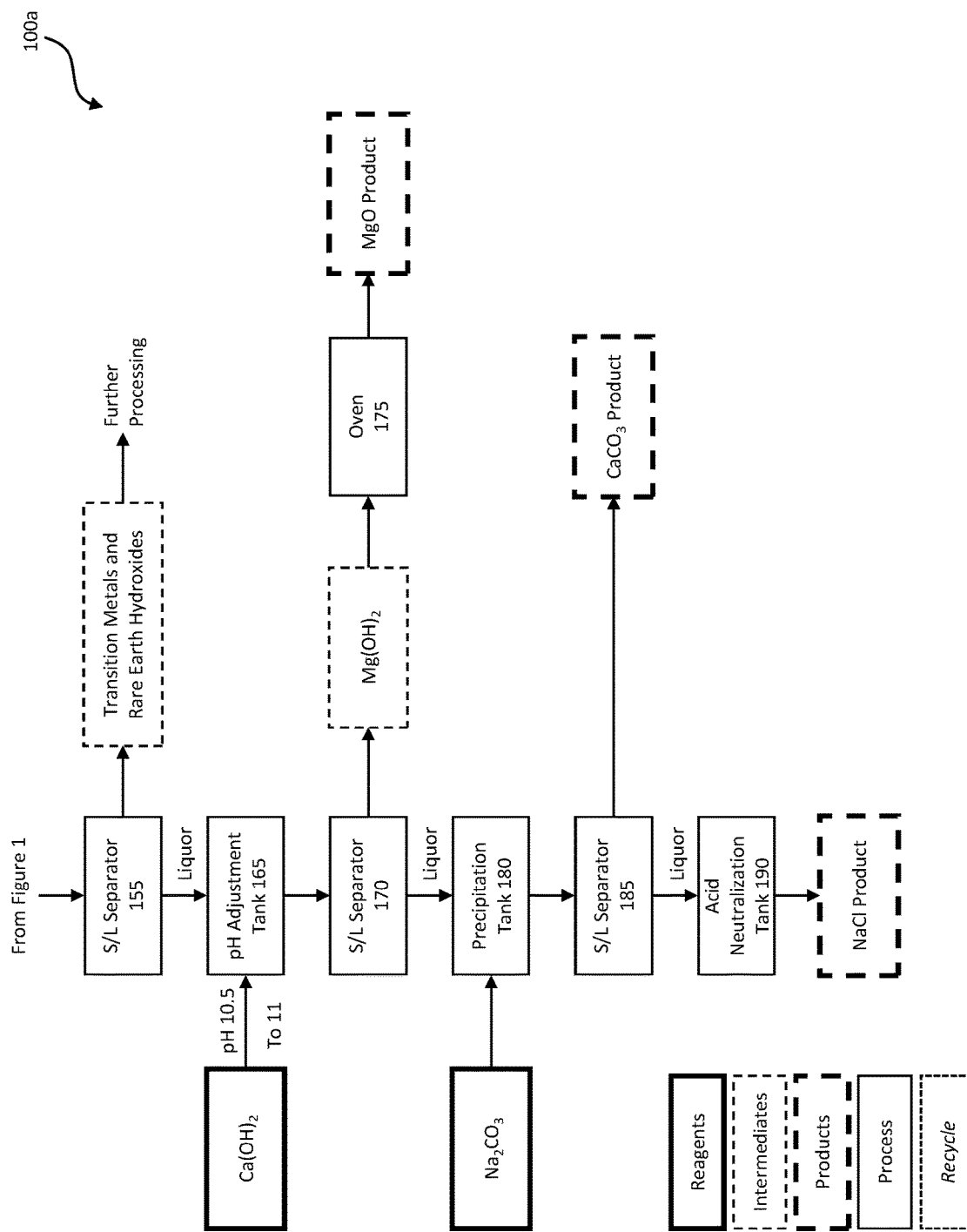
FIG. 2 is a continuation of the FIG. 1 flowsheet.
Figure 3:
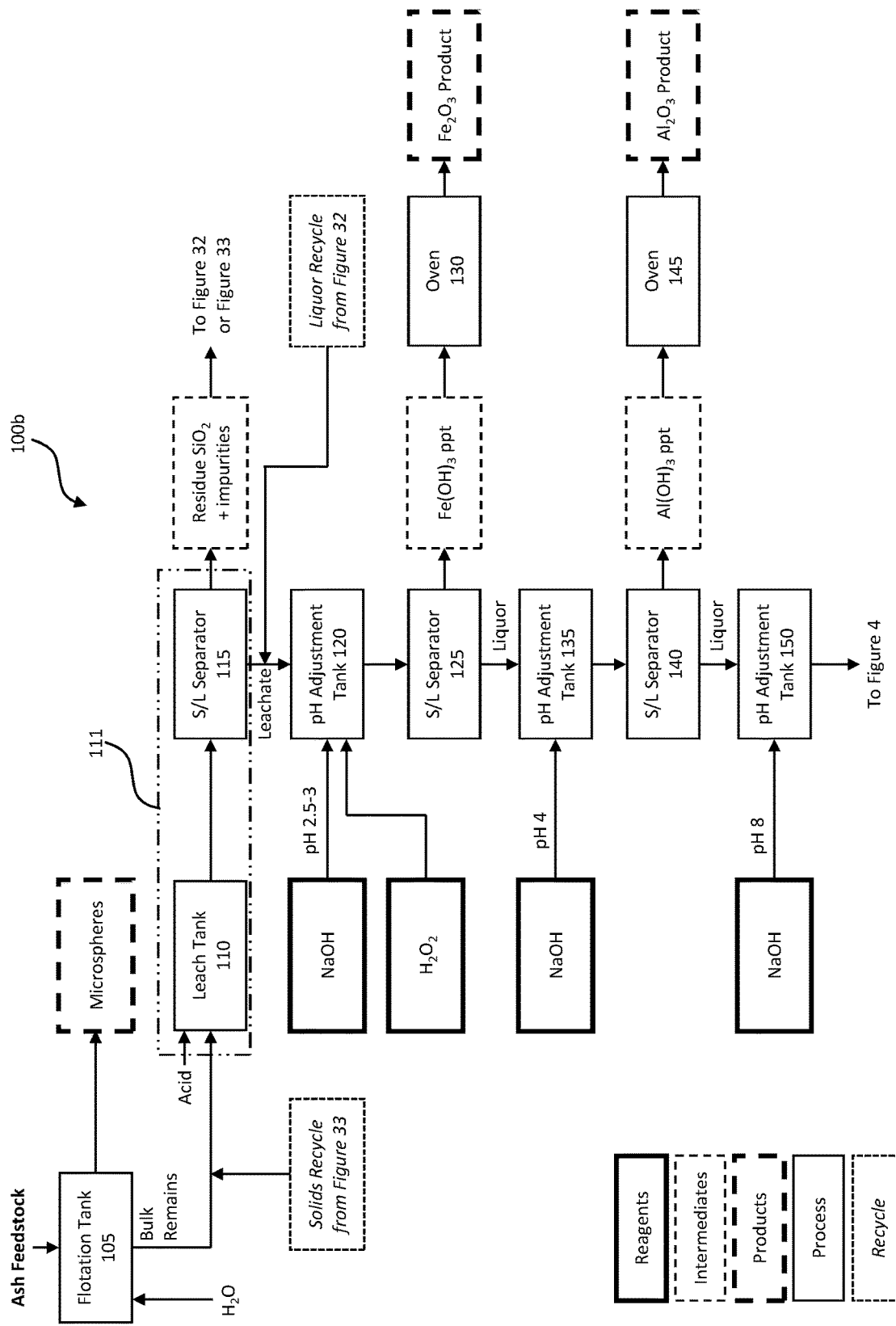
FIG. 3 depicts a caustic embodiment of an ash conversion system and process.
Figure 4:
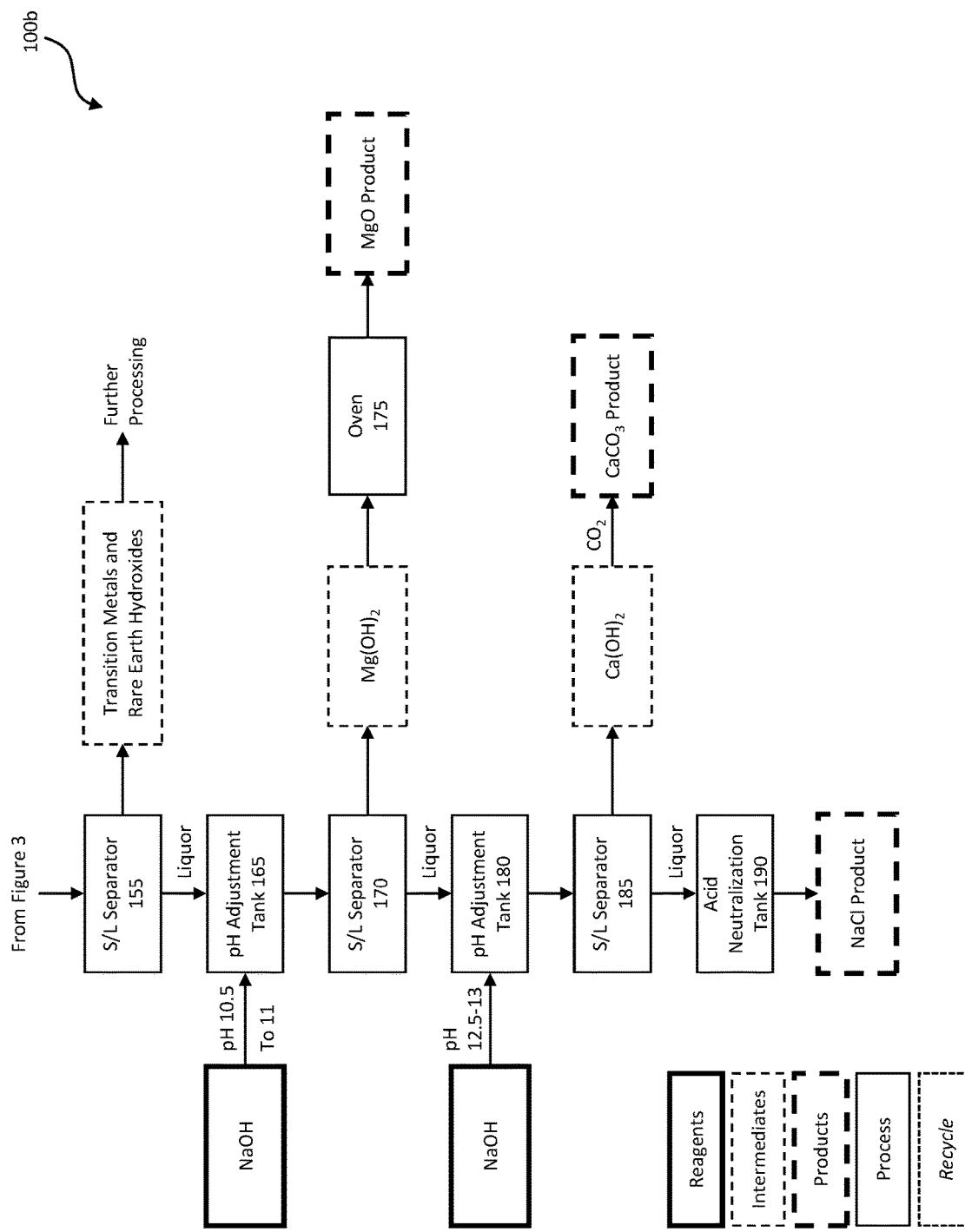
FIG. 4 is a continuation of the FIG. 3 flowsheet.
Figure 14:
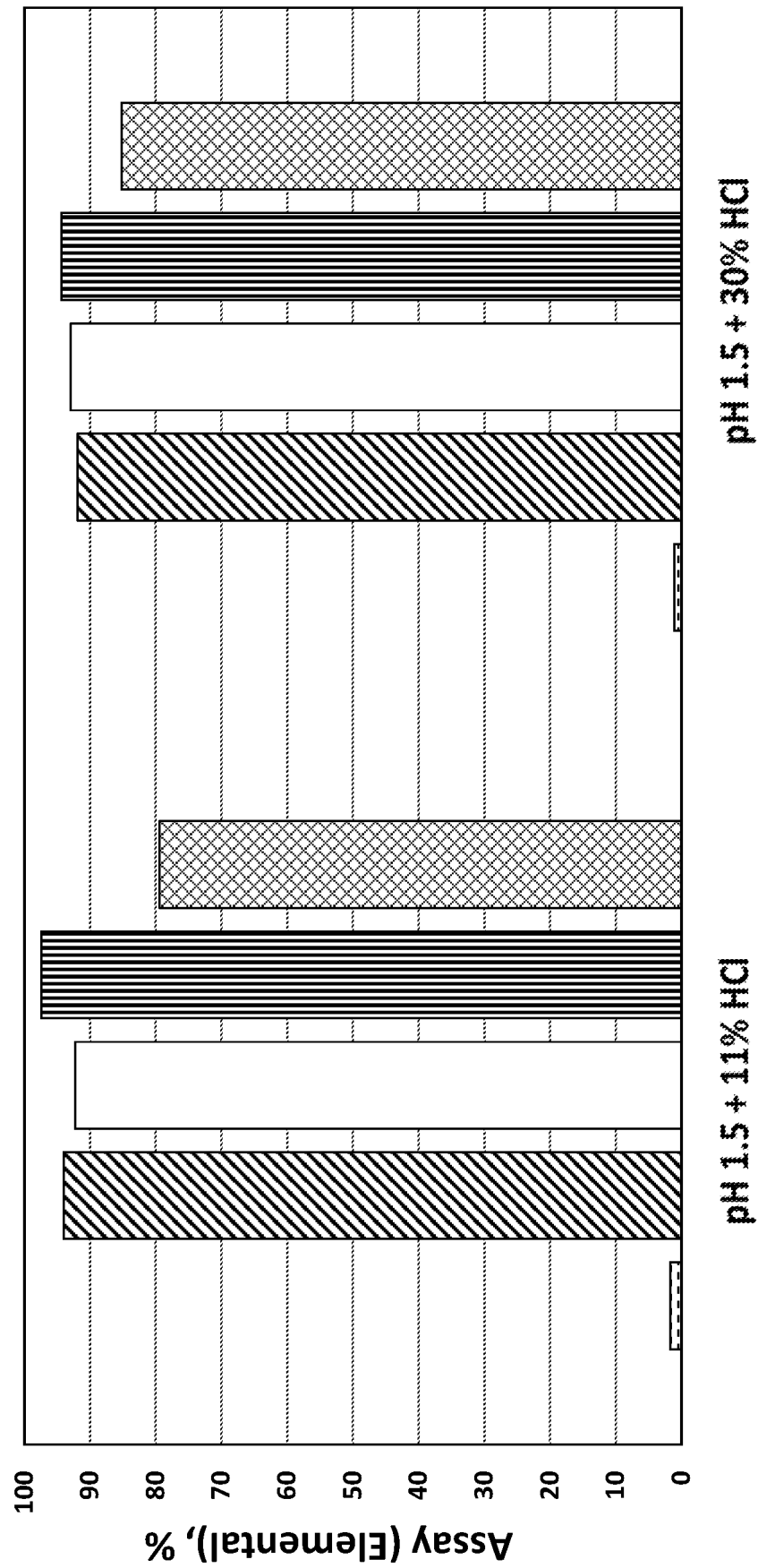
FIG. 14 graphically depicts 11% versus 30% hydrochloric acid leachates for class C ash feedstock.
Figure 15:
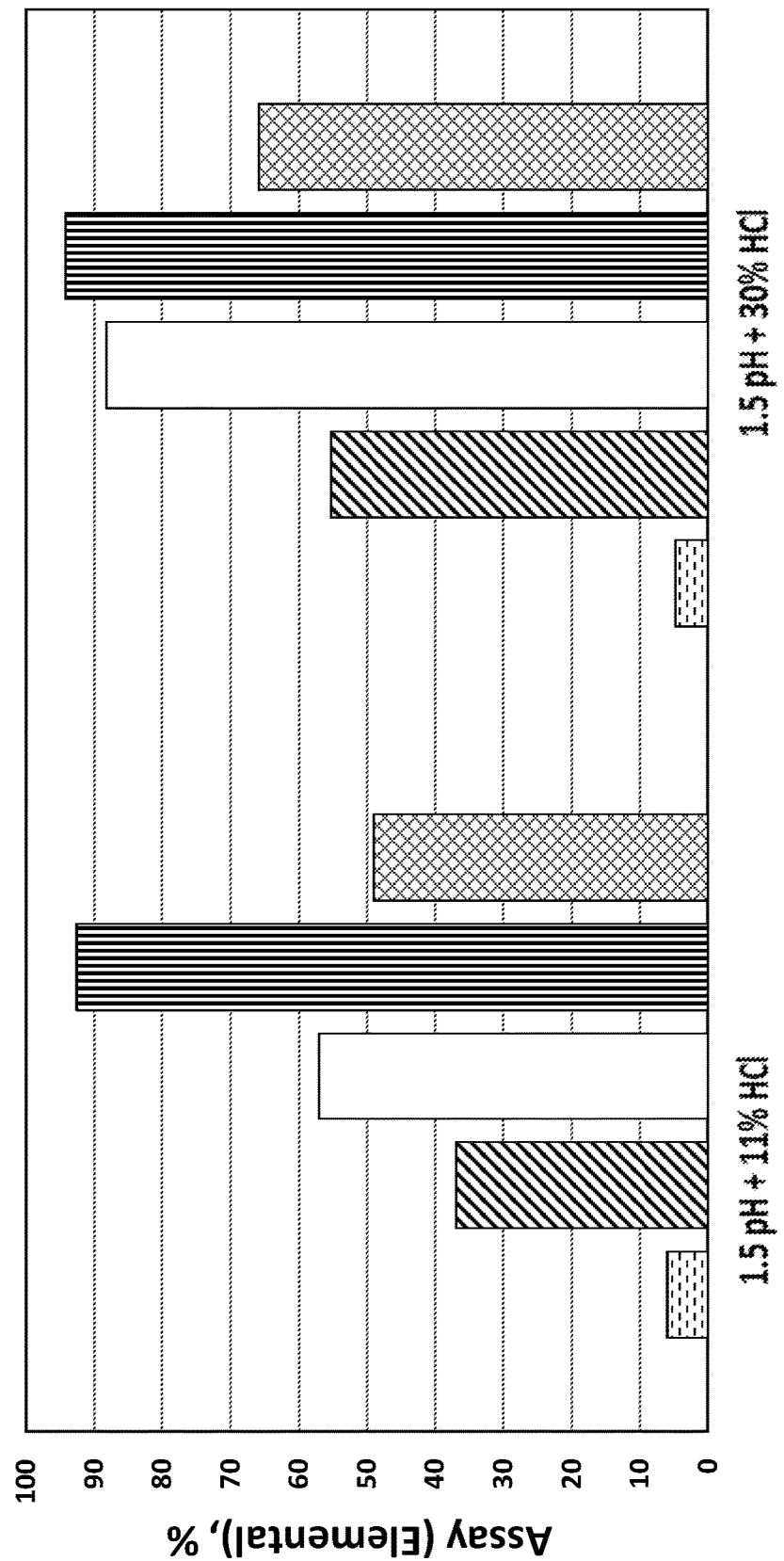
FIG. 15 graphically depicts 11% versus 30% hydrochloric acid leachates for class F ash feedstock.
Figure 16:
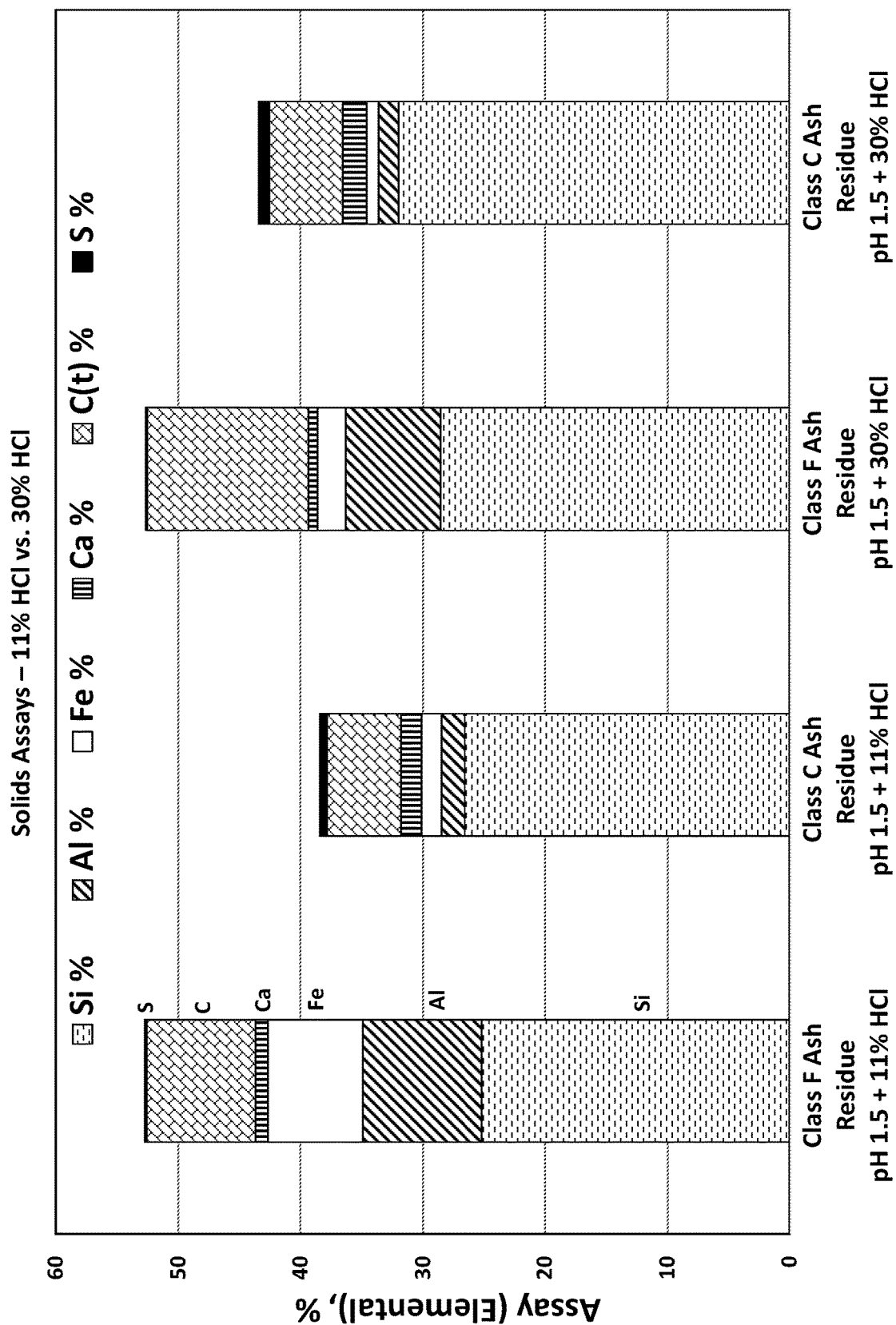
FIG. 16 graphically depicts elemental composition of 11% versus 30% hydrochloric acid residues for class C ash and class F ash feedstocks from FIGS. 11 and 12 leaches.

FIGS. 1 through 4 depict embodiments of an ash conversion system and method for producing valuable products from an ash feedstock with near zero waste. FIGS. 1 and 2 depict a lime embodiment of the ash conversion system and method and FIGS. 3 and 4 depict a caustic embodiment of the ash conversion system and method. In some embodiments, the ash feedstock is powdered. In some embodiments, the ash feedstock is slurried.

Lime Embodiment

FIGS. 1 and 2 depict a lime embodiment 100a of the ash conversion system and method for producing valuable products from an ash feedstock with near-zero waste. In the depicted embodiment, ash feedstock is first floated with water in flotation tank 105 to remove microspheres which can be marketed as a product. In some embodiments, microspheres make up 1-2% of the ash feedstock. The remainder of the ash feedstock, with optional solids recycle from a silica fusion process depicted in FIG. 33, proceeds to leach tank 110 in leach process 111. Leaching may be completed in one or two stages using one or more different acids or different concentrations of the same acids resulting in leached ash feedstock. In some embodiments, leaching is performed in two-stages with hydrochloric acid (HCl) of differing concentrations. The leach process 111 is disclosed in more detail using examples and experimental data under the Examples heading and in FIG. 18.

Still referring to FIG. 1, the leached ash feedstock is separated in solid/liquid separator 115 resulting in solids, comprising silica and other impurities in some embodiments, and liquor. The solids may proceed to either FIG. 32 or FIG. 33 for further processing. The liquor from solid/liquid separator 115, along with optional liquor recycle from FIG. 32 proceeds to a pH adjustment tank 120 where pH is adjusted to precipitate particular components. In the depicted embodiment, the pH is first adjusted to pH 1 using calcium carbonate ($CaCO_3$) then to between pH 2.5 to 3 using calcium hydroxide ($Ca(OH)_2$ or lime). Hydrogen peroxide ($H_2O_2$) may also be added to the pH adjustment tank 120 to convert ferrous iron to ferric iron. The pH adjusted solution from pH adjustment tank 120 proceeds to solid/liquid separator 125 resulting in solids comprising predominantly iron hydroxide ($Fe(OH)_3$) precipitate and liquor. The $Fe(OH)_3$ may be marketed as-is or calcined in an oven 130 (at 300° C., in some embodiments) with air circulation to iron oxide (alpha-$Fe_2O_3$). The liquor from solid/liquid separator 125 proceeds to a second pH adjustment tank 135 where the pH is adjusted to pH 4 using $Ca(OH)_2$, in the depicted embodiment. The pH adjusted solution from pH adjustment tank 135 proceeds to solid/liquid separator 140 resulting in solids comprising predominantly aluminum hydroxide ($Al(OH)_3$) and liquor. The $Al(OH)_3$ can be marketed as-is or calcined in an oven 145 (at 250° C., in some embodiments) to alumina ($Al_2O_3$). The liquor from solid/liquid separator 140 proceeds to a third pH adjustment tank 150 where the pH is adjusted to pH 8 using $Ca(OH)_2$, in the depicted embodiment. The pH adjusted solution from pH adjustment tank 150 proceeds to FIG. 2.

FIG. 2 is a continuation of FIG. 1. The pH adjusted solution from the third pH adjustment tank 150 proceeds to solid/liquid separator 155 resulting in solids comprising predominantly rare earth hydroxides and some transition metals. The transition metals and rare earth hydroxides may be sold as-is or may proceed to further separation/processing disclosed in more detail under the Products heading. The liquor from solid/liquid separator 155 proceeds to a fourth pH adjustment tank 165 where the pH is adjusted to pH 10.5 to 11 using Ca(OH)$_2$, in the depicted embodiment. The pH adjusted solution from pH adjustment tank 165 proceeds to solid/liquid separator 170 resulting in solids comprising predominantly magnesium hydroxide (Mg(OH)$_2$) and liquor. The Mg(OH)$_2$ may be marketed as-is or may be calcined in an oven 175 (at 250° C., in some embodiments) to magnesium oxide (MgO). The liquor from solid/liquid separator 170, which contains calcium ions, proceeds to precipitation tank 180 where a stoichiometric amount of sodium carbonate (Na$_2$CO$_3$) is added to precipitate calcium carbonate. The solution from the precipitation tank 180 proceeds to solid/liquid separator 185 resulting in solid calcium carbonate (CaCO$_3$) and a liquor. The total calcium carbonate produced is the sum of the calcium in the ash feed plus the lime reagent (Ca(OH)$_2$) used for pH adjustment. The liquor from solid/liquid separator 185 proceeds to an acid neutralization tank 190 where the hydroxides used in the solid/liquid separation steps (115, 125, 140 FIGS. 1 and 155, 170, 185 FIG. 2) are neutralized to pH 7 with HCl. The final product is sodium chloride (NaCl) and may be marketed as a solution (brine) or the NaCl salt may be crystallized out of the solution using a crystallizer or spray dryer (not depicted).

Caustic Embodiment

The caustic embodiment 100b (FIGS. 20 and 21) of the ash conversion process comprises essentially the same steps and equipment as the lime embodiment 100a (FIGS. 18 and 19) of the ash conversion process with the primary difference being in the reagent used in pH adjustment steps. In the caustic embodiment, caustic (NaOH) is used in place of lime (Ca(OH)$_2$ in the pH adjustment steps. In some embodiments, the NaOH may be 20%.

FIGS. 3 and 4 depict a caustic embodiment 100b of the ash conversion system and method for producing valuable products from an ash feedstock with near-zero waste. In the depicted embodiment, ash feedstock is first floated with water in flotation tank 105 to remove microspheres which can be marketed as a product. In some embodiments, microspheres make up 1-2% of the ash feedstock. The remainder of the ash feedstock, with optional solids recycle from a silica fusion process depicted in FIG. 33, proceeds to leach tank 110 in leach process 111. Leaching may be completed in one or two stages using one or more different acids or different concentrations of the same acids resulting in leached ash feedstock. In some embodiments, leaching is performed in two-stages with hydrochloric acid (HCl) of differing concentrations. The leach process 111 is disclosed in more detail using examples and experimental data under the Examples heading and in FIG. 18.

Still referring to FIG. 3, the leached ash feedstock is separated in solid/liquid separator 115 resulting in solids, comprising silica and other impurities in some embodiments, and liquor. The solids may proceed to either FIG. 32 or FIG. 33 for further processing. The liquor from solid/liquid separator 115, along with optional liquor recycle from FIG. 32 proceeds to a pH adjustment tank 120 where pH is adjusted to precipitate particular components. In the depicted embodiment, the pH is adjust to 2.5-3 using sodium hydroxide (NaOH or caustic). Hydrogen peroxide (H$_2$O$_2$) may also be added to the pH adjustment tank 120 to convert ferrous iron to ferric iron. The pH adjusted solution from pH adjustment tank 120 proceeds to solid/liquid separator 125 resulting in solids comprising predominantly iron hydroxide (Fe(OH)$_3$) precipitate and liquor. The Fe(OH)$_3$ may be marketed as-is or calcined in an oven 130 (at 300° C., in some embodiments) with air circulation to iron oxide (alpha-Fe$_2$O$_3$). The liquor from solid/liquid separator 125 proceeds to a second pH adjustment tank 135 where the pH is adjusted to pH 4 using NaOH, in the depicted embodiment. The pH adjusted solution from pH adjustment tank 135 proceeds to solid/liquid separator 140 resulting in solids comprising predominantly aluminum hydroxide (Al(OH)$_3$) and liquor. The Al(OH)$_3$ can be marketed as-is or calcined in an oven 145 (at 250° C., in some embodiments) to alumina (Al$_2$O$_3$). The liquor from solid/liquid separator 140 proceeds to a third pH adjustment tank 150 where the pH is adjusted to pH 8 using NaOH, in the depicted embodiment. The pH adjusted solution from pH adjustment tank 150 proceeds to FIG. 2.

FIG. 2 is a continuation of FIG. 1. The pH adjusted solution from the third pH adjustment tank 150 proceeds to solid/liquid separator 155 resulting in solids comprising predominantly rare earth hydroxides and some transition metals. The transition metals and rare earth hydroxides may be sold as-is or may proceed to further separation/processing disclosed in more detail under the Products heading. The liquor from solid/liquid separator 155 proceeds to a fourth pH adjustment tank 165 where the pH is adjusted to pH 10.5 to 11 using NaOH, in the depicted embodiment. The pH adjusted solution from pH adjustment tank 165 proceeds to solid/liquid separator 170 resulting in solids comprising predominantly magnesium hydroxide (Mg(OH)$_2$) and liquor. The Mg(OH)$_2$ may be marketed as-is or may be calcined in an oven 175 (at 250° C., in some embodiments) to magnesium oxide (MgO). The liquor from solid/liquid separator 170 proceeds to a fifth pH adjustment tank 180 where the pH is adjusted to between 12.5-13 using NaOH, in the depicted embodiment. The pH adjusted solution from pH adjustment tank 180 proceeds to solid/liquid separator 185 resulting in solid calcium hydroxide (Ca(OH)$_2$) and liquor. In some embodiments, sodium carbonate may be added to the liquor from 185 to precipitate traces of barium and strontium before neutralization in tank 190. The Ca(OH)$_2$ may be converted to calcium carbonate (CaCO$_3$) with the addition of CO$_2$. The liquor from solid/liquid separator 185 proceeds to an acid neutralization tank 190 where the hydroxides used in the solid/liquid separation steps (115, 125, 140 FIGS. 3 and 155, 170, 185 FIG. 4) are neutralized to pH 7 with HCl. The final product is sodium chloride (NaCl) and may be marketed as a solution (brine) or the NaCl salt may be crystallized out of the solution using a crystallizer or spray dryer (not depicted). In some embodiments of the caustic flowsheet, the final calcium precipitation is not performed, and the final product is a sodium chloride/calcium chloride blend.

Process Equipment Options

The solid/liquid separators depicted in FIGS. 1 through 4 may be any one or more of centrifuges, disc, pan, belt, or drum filters, or other solid/liquid separators. To help coagulation of the precipitate and ease filtration, techniques such as heating or seeding with recycled product (10-30%) could be used. Calcine temperatures may be between 250° C. and 300° C. Material transfer between processes/equipment may be carried out with the use of pumps, etc.

Feedstocks

The ash conversion systems and methods disclosed herein are capable of being applied to waste streams other than coal ash such as red mud waste from the bauxite (comprising Fe$_2$O$_3$, Al$_2$O$_3$, SiO$_2$, CaO, Na$_2$O, TiO, K$_2$O and MgO) in the synthesis of aluminum, slag from the steel furnaces (comprising CaO, SiO$_2$, Al$_2$O$_3$, FeO, and MgO), municipal incinerator solid waste, acid mine drainage, mine tailings, and other metal bearing waste streams, because of their similar compositions. Some variations in type and composition of feedstock may require additional or fewer processing steps. In some embodiments, feedstock may require grinding to reduce particle size prior to processing in the ash conversion process. The feedstock may be in powder form wherein powder is a bulk solid composed of many very fine particles. In some embodiments, feedstock may need to be dispersed in slurry prior to processing in the ash conversion process. The feedstock may be a slurry of metal-bearing solids suspended in liquid.

Products

The products are generally 1) silica, 2) ferric oxide, 3) aluminum oxide, 4) a mixture of REE and transition elements that are concentrated between 20 to 100-fold from the original coal ash, 5) magnesium oxide, 6) calcium carbonate, and 7) sodium chloride. The oxides originally precipitate as hydroxides and may optionally be marketed as such. In some embodiments, the hydroxides may be converted to carbonates using reactants such as carbon dioxide. In some embodiments, manganese may be precipitated between the REEs and the magnesium at a pH of 9.

The leach residue from solid/liquid separator 115 (FIGS. 1 and 3) is predominantly amorphous and crystalline silica, technical grade, which has commercial applications. Commercial applications for the silica product include: as additives in tires, elastomers, and plastics; in the construction industry as an anti-caking agent; for sand casting for manufacture of metallic components; and for use in glassmaking and ceramics. The value improves with higher purity, smaller particle size, and larger surface areas. With some ash feedstocks, the silica also contains some aluminum silicate such as fibrous mullite or high aspect ratio mullite. This mullite could have its own intrinsic high value for uses in high temperature applications as in ceramic-in-ceramic fiber reinforcements for ceramic engines.

Ferric oxide is used primarily as a pigment in paints, glazes, coatings, colored concrete, mulches, mordant, coating for magnetic recording tapes, the manufacturing of polishing compounds and as an abrasive for glass, precious metals, and diamonds.

Aluminum hydroxide is often used as a feedstock for the manufacture of other aluminum compounds and in the manufacture of abrasives, water-proofing, water treatment, and as a filter medium. Additional uses include the manufacture of aluminosilicate glass, a high melting point glass used in cooking utensils and in the production of fire clay, pottery, and printing ink. Aluminum oxide is often used in glass, water purification, paint, and as a filler in plastics and cosmetics.

Magnesium hydroxide is used in the waste water treatment process; as a flame or fire retardant filler; as a fuel additive to treat heavy fuel oils; as well as in the ceramic glazing process. Magnesium oxide is used as an anticaking agent in foods, in ceramics to improve toughness, and in optics. Magnesium carbonate is used in fireproofing, a smoke suppressant in plastics, and a reinforcing agent in rubber.

Calcium carbonate has a plethora of uses in many diverse industries including: the oil and gas industry as drilling fluid make-up to increase the fluid density, as an additive to control fluid loss to formation, the oilfield cementing industry as a loss circulation material; the building materials and construction industry for roofing shingles, tiles, cement, brick, and concrete block manufacture; and commercial applications such as industrial filler in the paper, paint, plastics, and rubber industries.

Sodium chloride solution is used in a myriad of industrial applications. It is used in the chlor-alkali process, the process to produce chlorine and sodium hydroxide (see Examples for more detail). It is also widely used as a de-icing and anti-icing agent in winter climate road applications and as a dust suppressant in many mining operations. Crystallization of sodium chloride solution will produce dry sodium chloride crystals, commonly referred to as salt. Sodium chloride crystals are used across oil and gas exploration activities as an additive to drilling fluids as well as cementing operations, in the pulp and paper industry as a bleaching product for wood pulp, in the water softening industry, swimming pool chemical industry as pool salt and in a great number of other industrial applications.

EXAMPLES

Preliminary Testing

Class F ash feedstock from Northern Appalachian coal and class C ash feedstock from Powder River Basin Coal were used in preliminary testing of the ash conversion process to ensure wide applicability. Class C ash feedstock contains more calcium and less silica while class F ash feedstock contains less calcium and more silica and is more difficult to acid leach. FIGS. 5 through 7 depict the compositions (elemental composition as well as mineral compounds by XRD) of the class F and class C ash feedstocks used in preliminary testing of the ash conversion process.

Leach Process Testing

Several different acid lixiviant combinations were tested in initial leach scout testing to determine the best acid lixiviants to obtain the largest extraction of all the elemental components in the ash feedstock, except for silica which is left as a marketable residue. The acid lixiviants used in initial leach scouting tests were nitric acid, hydrochloric acid, sulfuric acid, sulfuric with sodium fluoride and calcium fluoride, 6N aqua regia, and strong caustic. After the initial leach scouting tests, the following leach tests were performed on both class F and class C ash feedstocks: 6N aqua regia (HCl & $HNO_3$) (FIG. 8), 6N $H_2SO_4$+0.006N NaF (FIG. 9), 6N $H_2SO_4$+0.05% $CaF_2$ (FIG. 10), 2-stage HCl pH 1.5 then 11% HCl (FIGS. 11), and 2-stage HCl pH 1.5 then 30% HCl (FIG. 12). All leach tests were performed at 90° C., a solids ratio of 14%, and five sampling times, 0.5, 1, 2, 4, and 6 hours. The results depicted in FIGS. 8 through 10 are for 6 hour sample times and FIGS. 11 through 12 are for four hour each stage sample times. 90° C. is the maximum temperature without boiling the solution and, theoretically, should result in maximum dissolution. All leachates and residues from leach testing were analyzed compositionally and mineralogically.

The leach test procedure described below is for exemplary purposes only and should not be considered limiting.

1. Prepare initial lixiviant solution in a reactor (all in a fumehood, in some embodiments). Slowly add the ash feedstock solids (200 g) to the solution a few grams at a time. Target 14% solids.
2. Equip reactor with a lid and condenser, agitate pulp with a mixer and impellor.
3. Heat to target temperature (90° C.) with heating mantle or other heating method. Time zero occurs when target temperature is achieved.
4. Collect pulp samples of about 40 mL at different time intervals to determine the effect of time on leaching. Record net weight, filter, collect the filtrate, and record key data. Return solids to reactor. Keep filtrate for assay.
5. After required test time, record the net pulp weight, filter and collect filtrate, record filtration properties (time, color, paper type, etc.), determine weight, specific gravity, pH, and oxidation reduction potential (ORP).
6. Re-pulp the residue with the target amount of wash water (200 mL).
7. Displacement wash three times with 70 mL water. Displacement washing may be done two to four times in water.
8. Collect the combined wash liquors, record filtration properties (time, color, paper type, etc.), determine weight, specific gravity, pH, and ORP.
9. Dry solids at 95° C. or lower until weight of solids remains constant.
10. Submit samples for assay.

Leach test results are labeled as poor, good, or excellent. Poor results are when less than 65% dissolution is achieved for the target elements, good results are when 65% to 90% dissolution is achieved, and excellent results are when 90% to 100% dissolution is achieved.

FIG. 8 is a table depicting leach test results of class F and class C ash feedstocks using 3:1 6N hydrochloric acid (HCl) to 6N nitric acid ($HNO_3$) for 6 hours. FIG. 8 indicates good leaching results but the reaction was very vigorous and NOx fumes were liberated. The 6N aqua regia was found to be effective for the more difficult to dissolve class F ash feedstock; however, the aqua regia adds nitrate to the final sodium chloride product of the ash conversion process which is not ideal because it results in a sodium chloride/sodium nitrate mixture which is more difficult to market than sodium chloride.

FIG. 9 is a table depicting leach test results of class F and class C ash feedstocks using 6N sulfuric acid ($H_2SO_4$) and 0.006N sodium fluoride (NaF). This reaction forms insoluble sulfates with calcium so it remains with the insoluble silica. Class F ash feedstock dissolution was poor.

FIG. 10 is a table depicting leach test results of class F and class C ash feedstocks using 6N sulfuric acid ($H_2SO_4$) and 0.05% calcium fluoride ($CaF_2$). This testing had similar results to FIG. 9 (6N sulfuric acid and 0.006N sodium fluoride).

FIG. 11 is a table depicting leach test results of class F and class C ash feedstocks using HCl to pH 1.5 in a first stage then 11% HCl in a second stage. The dissolution of the class C ash feedstock was excellent but class F ash feedstock did not perform as well. Most of the calcium dissolves in the first stage at pH 1.5. There is improved dissolution at the higher acid concentration for the other major elements. Dissolution continued to improve with time.

FIG. 12 is a table depicting leach test results of class F and class C ash feedstocks using HCl to pH 1.5 in a first stage then 30% HCl in a second stage. The class F ash feedstock had much better dissolution at 30% HCl in the second stage compared to the 11% HCl in FIG. 11. The class C ash feedstock dissolution, on the other hand, only improved slightly compared to the 11% HCl second stage in FIG. 11. The class F ash feedstock showed that the leaching improved with time.

FIG. 13 is a table depicting leach test results for continuing the second-stage (30% HCl) leach of FIG. 12 for class C ash feedstock for 24 hours. The longer leach test time improved dissolution for all elements and results in improved quality of silica residue.

It should be noted that better extractions are obtained by leaching for longer times (up to 24 hours was tested) and can be used to optimize the dissolution. In theory, leaching times in excess of 24 hours are feasible but further increases in dissolution of the elements reduces exponentially over time.

Comparisons of the leach test results between 11% HCl and 30% HCl on both class F and class C ash feedstocks are shown in FIGS. 14 through 17. The results for class F ash feedstock shows that the 30% acid is significantly more effective than the 11% acid. However, the benefit for class C ash feedstock is minor, therefore the 11% is a better selection from a reagent consumption consideration since the acid(s) used in the leaching step need to be neutralized in the next process steps with the addition of lime (FIGS. 1-2) or caustic (FIGS. 3-4), in some embodiments. For a lime production plant 100a (FIGS. 1-2) and a caustic production plant 100b (FIGS. 3-4), in some embodiments, concentrations around 30% HCl may be used for class F ash feedstocks and around 11% HCl for class C ash feedstocks.

Figure 18:
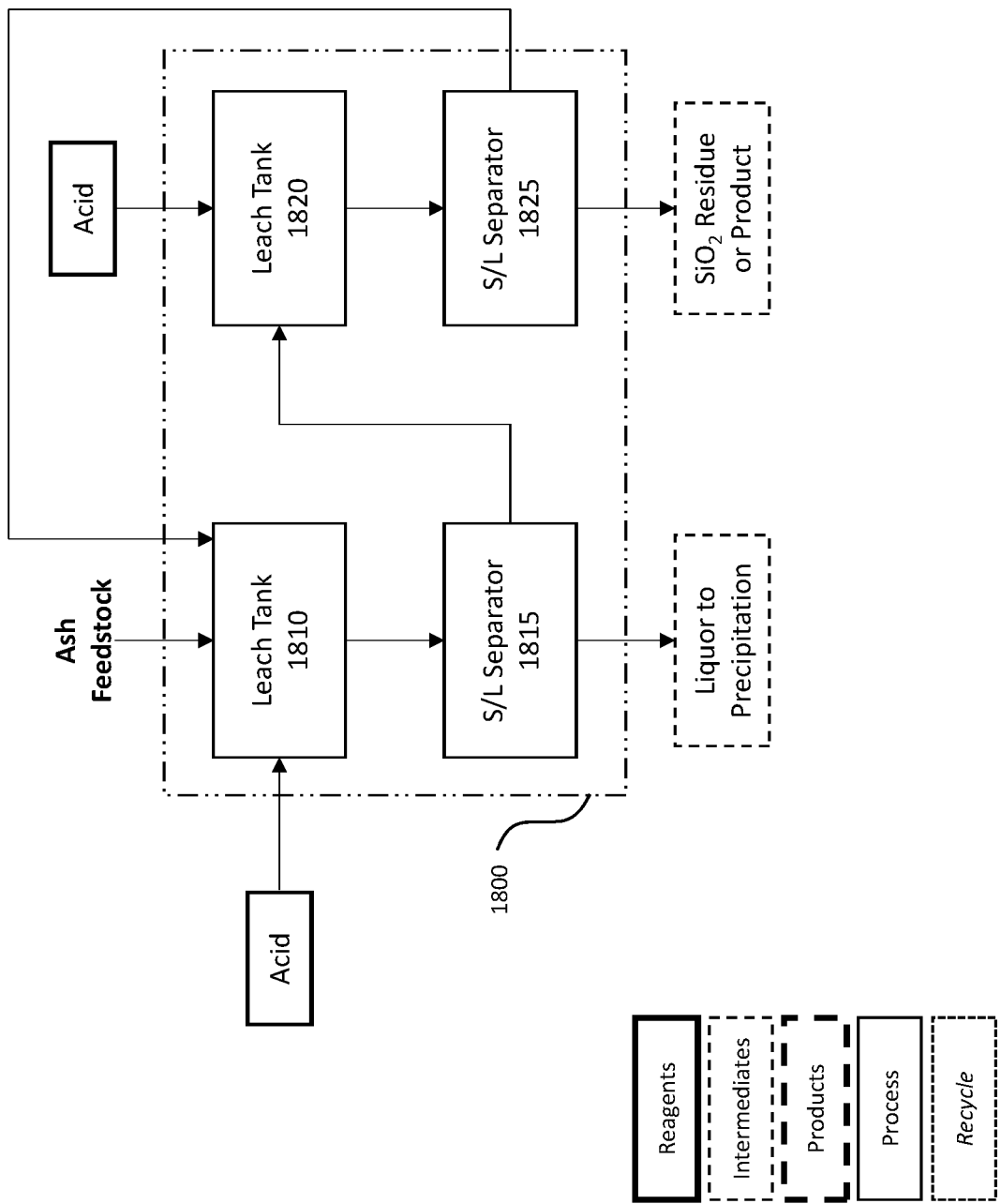
FIG. 18 is a flowsheet depicting a two-stage leach embodiment.

FIG. 18 depicts a two-stage leach process 1800. This process may replace the single stage leach process 111 depicted in FIGS. 1 and 3. In the two-stage leach process 1800, ash feedstock enters a first leach tank 1810 where it is leached with acid resulting in a first leachate. The first leachate proceeds to solid/liquid separator 1815 resulting in a liquor which proceeds to precipitation steps and a residue. The residue proceeds to a second leach tank 1820 resulting in a second leachate. The second leachate proceeds to solid/liquid separator 1825 resulting in a silica residue or product and a liquor. The liquor from solid/liquid separator 1825 is routed back to the first leach tank 1810. In some embodiments, the acid used in the first leach tank 1810 is HCl to pH 1.5. In some embodiments, the acid in the second leach tank is 11%-30% HCl.

X-ray Diffraction (XRD) patterns together with elemental analysis showed the final residues from the preliminary leach tests were primarily amorphous silica with minor amounts of crystalline silica, silicates (mullite), barite, phosphates, and titanates. The final residues from preliminary leach tests were grey in color due to a carbon impurity. Depending on the composition of the ash feedstock, residues may not have carbon impurities or may comprise other impurities. The silica residue may be calcined at 600° C. or higher to burn off all the carbon resulting in an off-white silica product with potentially improved market value over silica containing carbon impurities. These final residues can be further purified by an additional leaching in 30% HCl for 24 hours. The leachate may be combined with the other leachates and recycled through the ash conversion process, in some embodiments.

Precipitation Testing

In precipitation testing the liquors that resulted from leach testing were separated into value-added, marketable products. The separation was accomplished by adjusting the pH of the acidic solution using sodium hydroxide in precipitation testing. Calcium hydroxide, sodium carbonate, potassium hydroxide, or ammonium hydroxide may also be used to neutralize the acid. Sharp separations of numerous metals can be obtained by careful adjustment of the pH values. The general reactions are as follows:

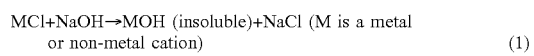
MCl+NaOH→MOH (insoluble)+NaCl (M is a metal or non-metal cation)        (1)

One adjustment that may be made prior to the first precipitation is to add hydrogen peroxide to oxidize ferrous ion to ferric ion. As shown in FIGS. 1-4 the sequence of precipitates is: Fe, Al, REEs and transition metals, Mg, and Ca for ash feedstock.

The precipitation test procedure described below is for exemplary purposes only and should not be considered limiting.

1. Add required amount of leachate feed solution (3000 mL) into a reactor (all in a fumehood, in some embodiments).
2. Prepare sufficient quantity (enough to increase the pH to the desired value) of neutralizing reagent (NaOH or $CaCO_3/Ca(OH)_2$) concentrated and dilute.
3. Equip reactor with lid; agitate pulp with mixer and impellor. pH, temperature, and ORP probes used.
4. No heat input required. Slowly begin to add neutralizing base reagent a few grams at a time. Use the more dilute reagent closer to the target pH. Time zero occurs when target pH is first achieved. Hold for one hour at target pH, with additional reagent additions as required.
5. Record all additions and temperature changes.
6. After required test time, record the net pulp weight, filter and collect filtrate, record filtration properties (time, color, paper type, etc.), determine weight, specific gravity, pH and ORP.
7. Displacement water wash three times with 100 mL of water. In some embodiments, displacement washing may be done two to four times in water.
8. Collect the combined wash liquors, record filtration properties (time, color, paper type, etc.), determine weight, specific gravity, pH, and ORP.
9. Dry solids at 95° C. or lower until weight of solids is constant.
10. Submit samples for assay as per requirements.

Figure 19:
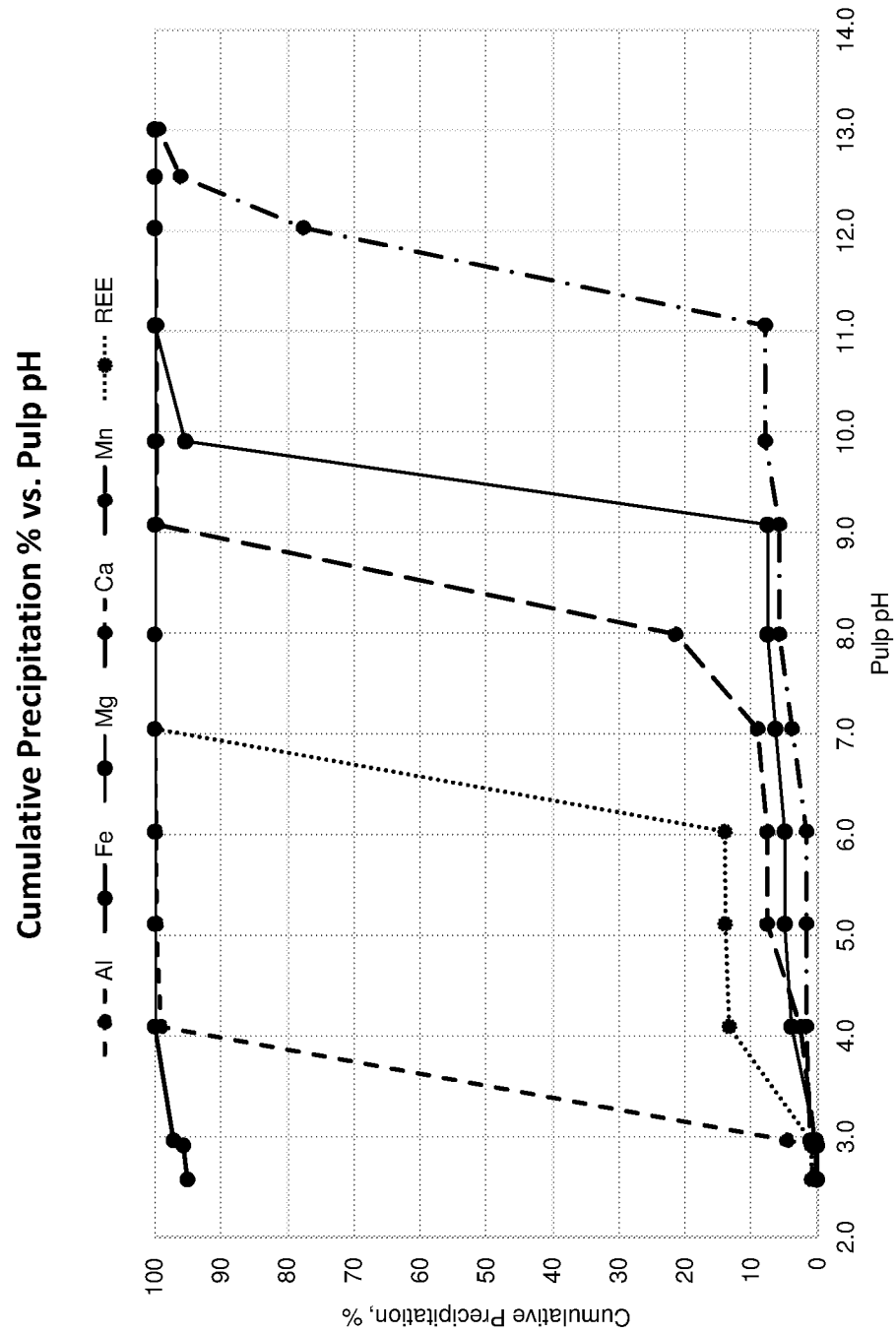
FIG. 19 is a chart depicting cumulative precipitation percent versus pulp pH for class C ash feedstock.
Figure 20:
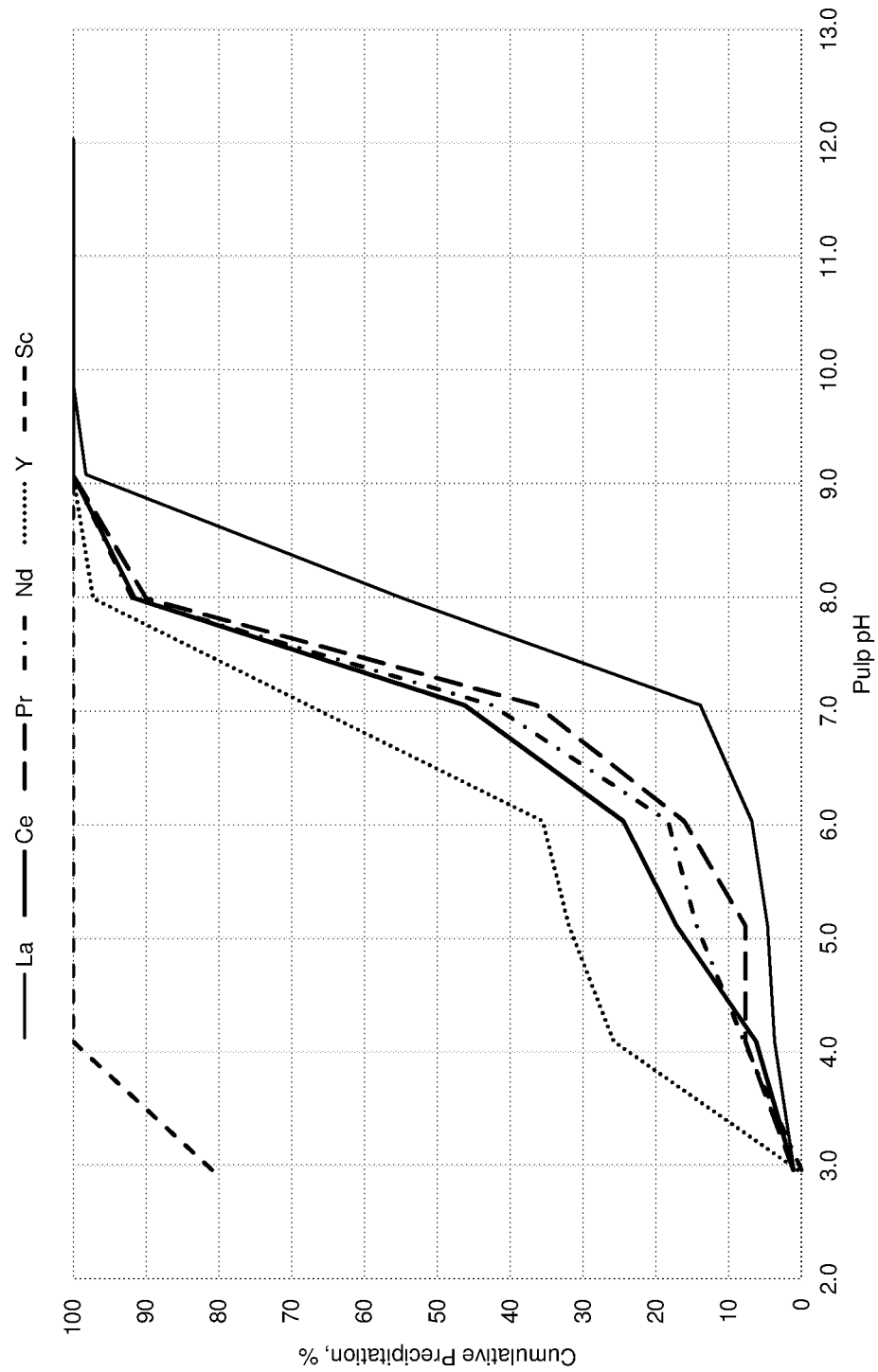
FIG. 20 is a chart depicting the cumulative precipitation of rare earth elements versus pulp pH for class C ash feedstock.

Precipitation testing identified target pHs (also referred to herein as pH cuts) at which one or more certain elements precipitated out of the leachate into the residue. FIG. 19 is a chart depicting cumulative precipitation percent versus pulp pH for class C ash. In some embodiments, after each pH cut, the liquor is filtered to separate a product and the filtrate is then subjected to the next pH condition. The precipitates for iron and aluminum are difficult to filter with simple vacuum filtration but that is facilitated by high speed centrifugation. Another approach is to seed the precipitation with 10-30% recycled product to produce more easily filterable solids (precipitate). Iron is best separated at pH 2.5 to 3 to minimize the amount of aluminum purities, and aluminum is then precipitated at pH 4. The precipitation of some of the rare earths is shown in FIG. 20. As can be seen, scandium precipitates with iron while most of the other REEs precipitate between pH 5 and pH 9. At pH 9, manganese may also be precipitated. Magnesium can be separated at pH 10.5-11 and calcium at pH 13. FIG. 21 is a table depicting the percent composition of precipitate hydroxides at different pHs resulting from precipitation testing.

The final liquor is a clean sodium chloride solution containing traces of strontium and barium when using sodium hydroxide as the base. It can be further purified by adding sodium carbonate and precipitating high value strontium and barium carbonates. At the end of this process, a marketable sodium chloride solution remains that can be marketed as a brine or dried to the salt. It should be noted that barium as the sulfate is mostly insoluble in the lixiviant so most of it is in the residue.

Figure 22:
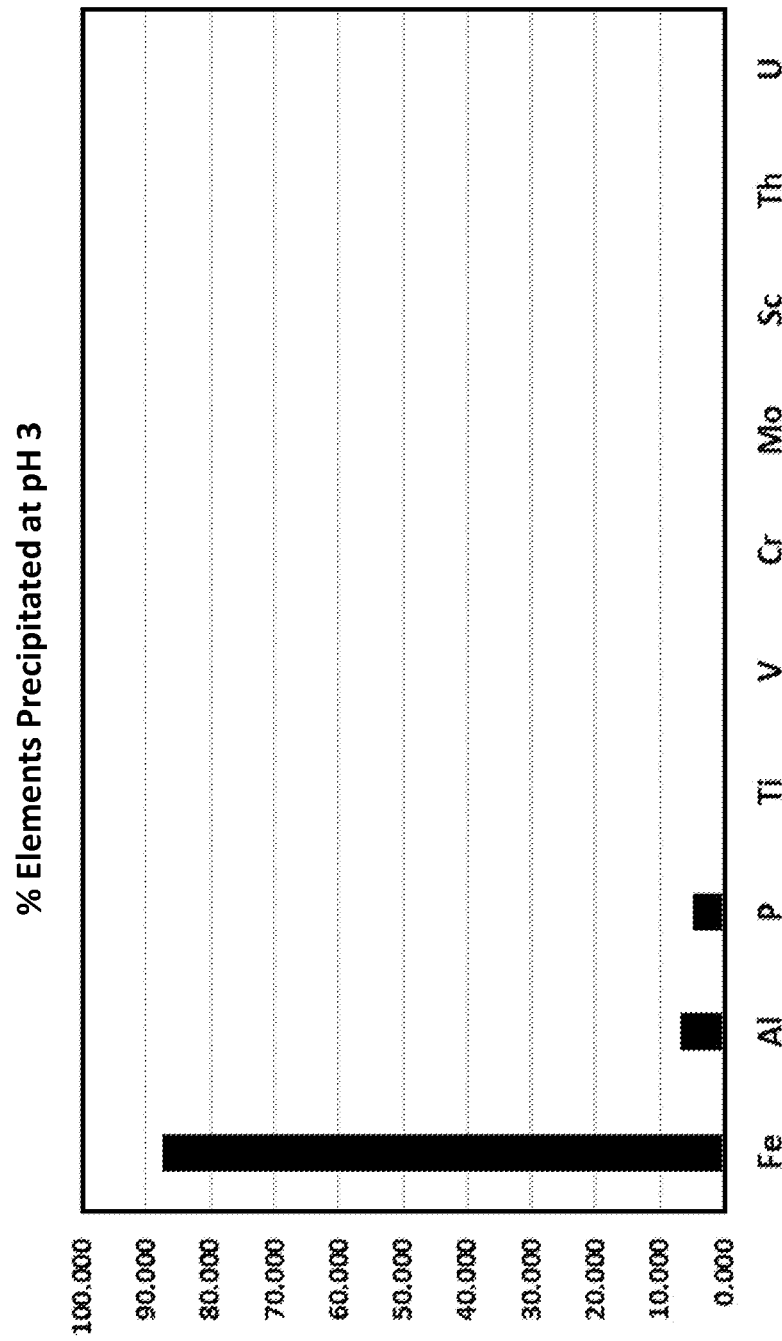
FIG. 22 is a chart depicting percent elements precipitated at pH 3 for class C ash feedstock.
Figure 23:
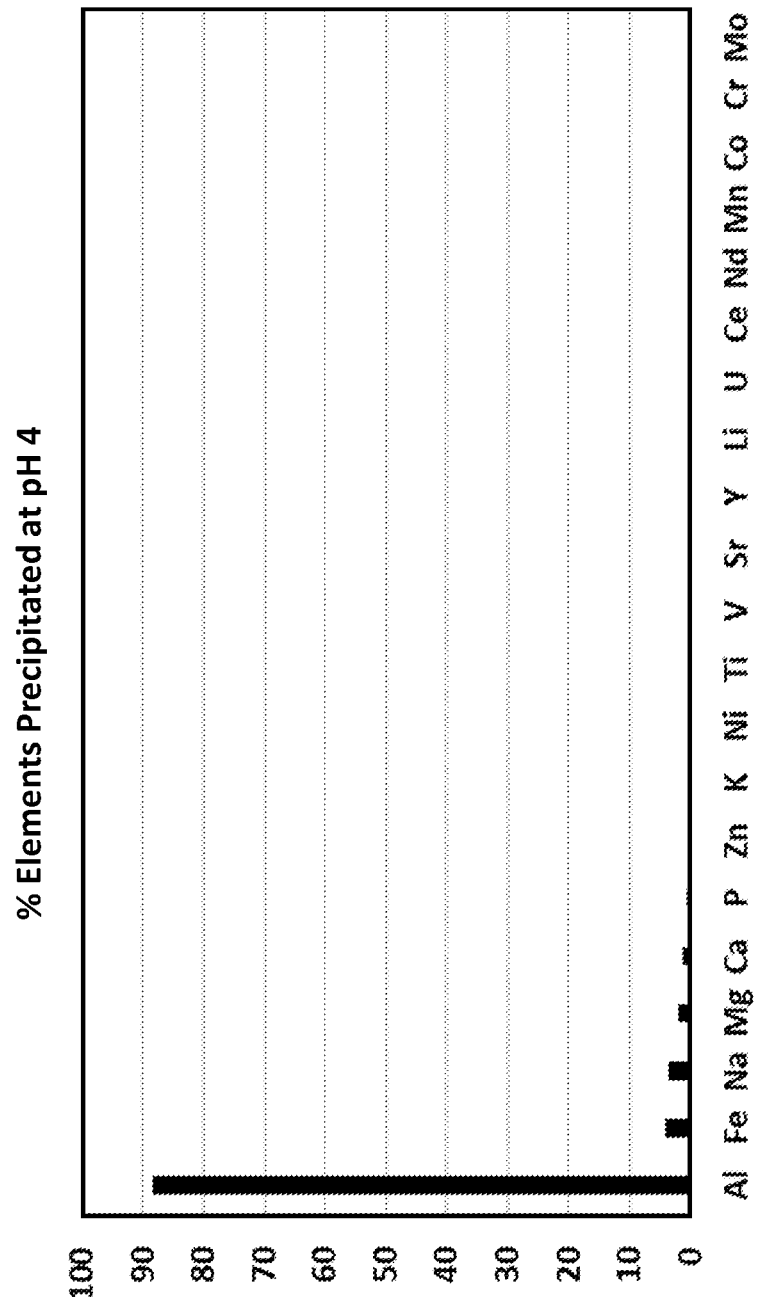
FIG. 23 is a chart depicting percent elements precipitated at pH 4 for class C ash feedstock.
Figure 24:
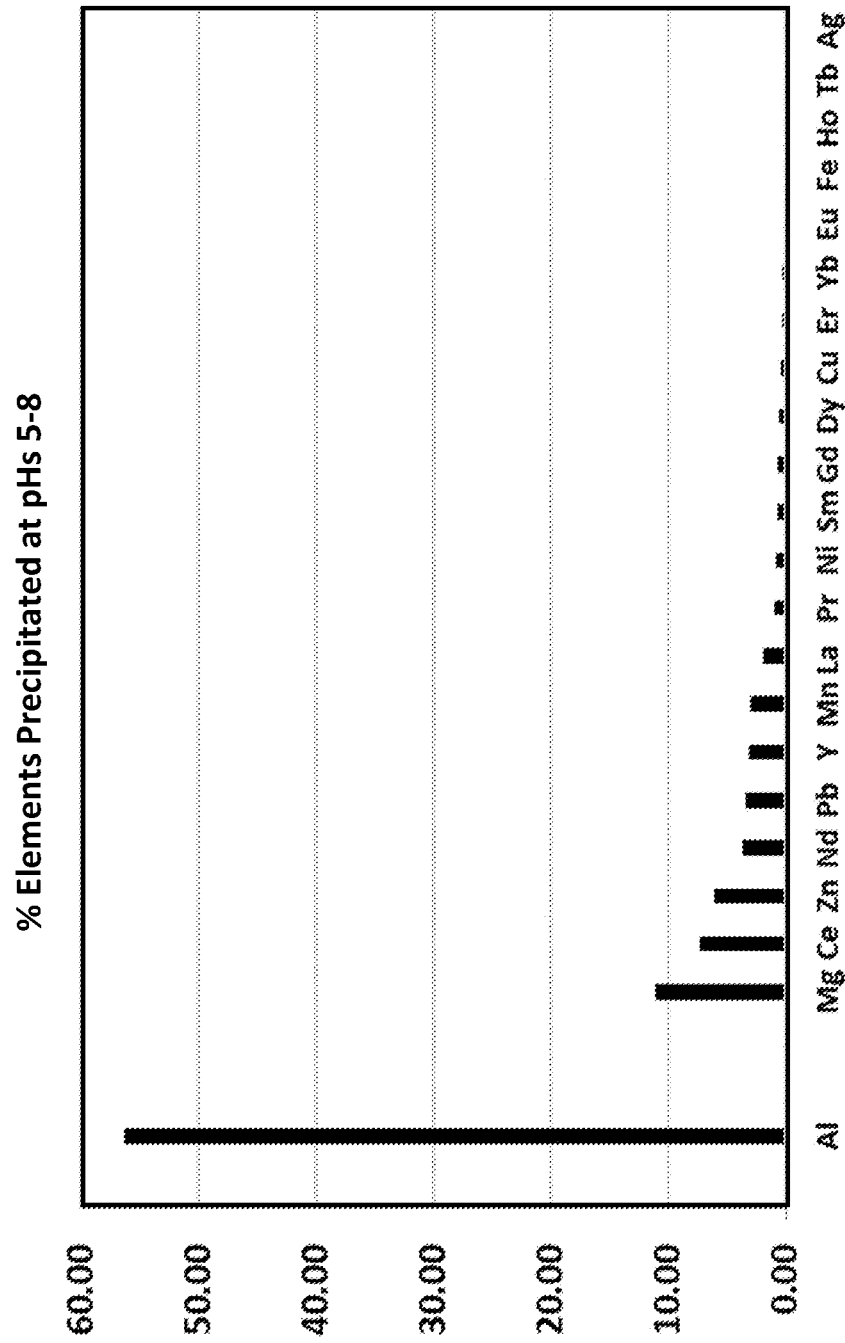
FIG. 24 is a chart depicting percent elements precipitated at pH 5-8 for class C ash feedstock.
Figure 25:
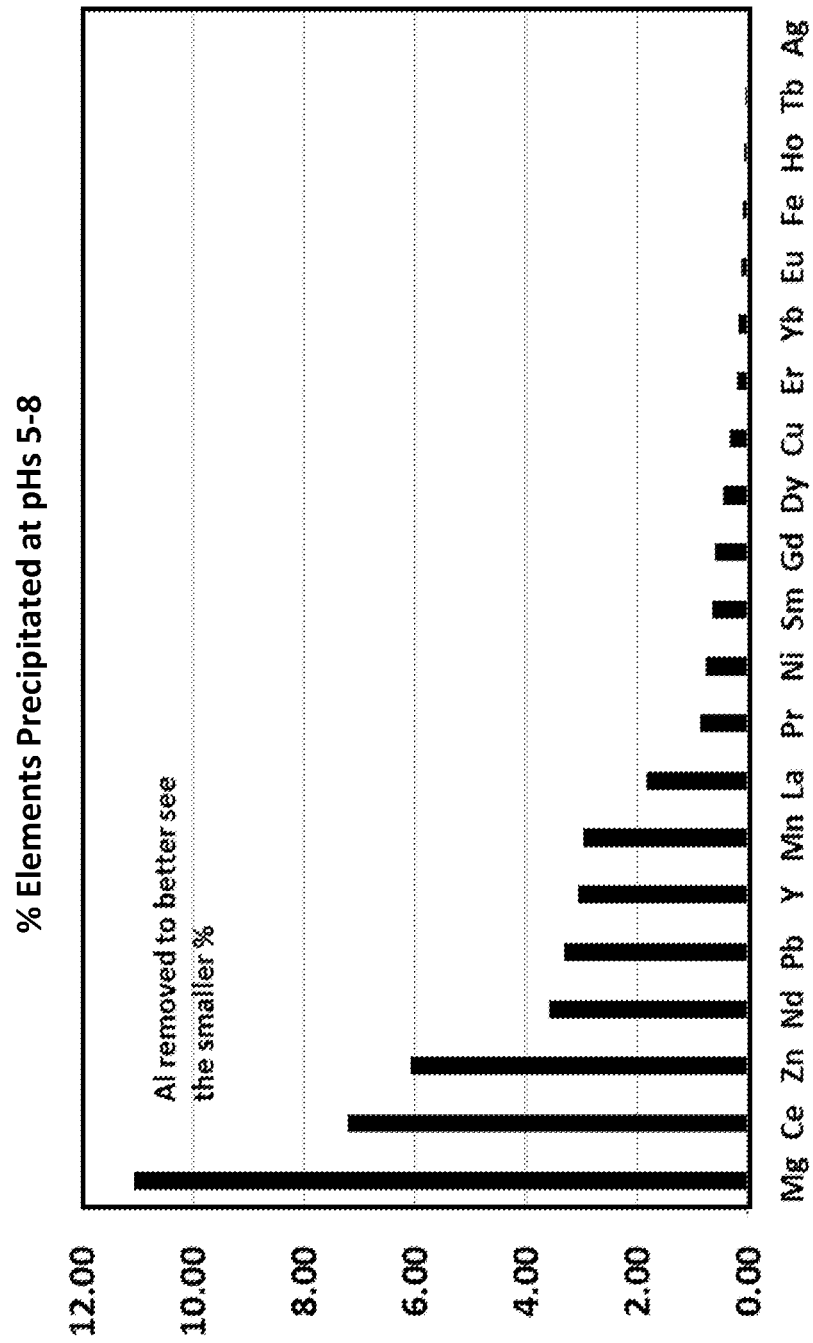
FIG. 25 is a chart depicting percent elements precipitated at pH 5-8 for class C ash feedstock with aluminum removed to show the smaller percentage more clearly.
Figure 26:
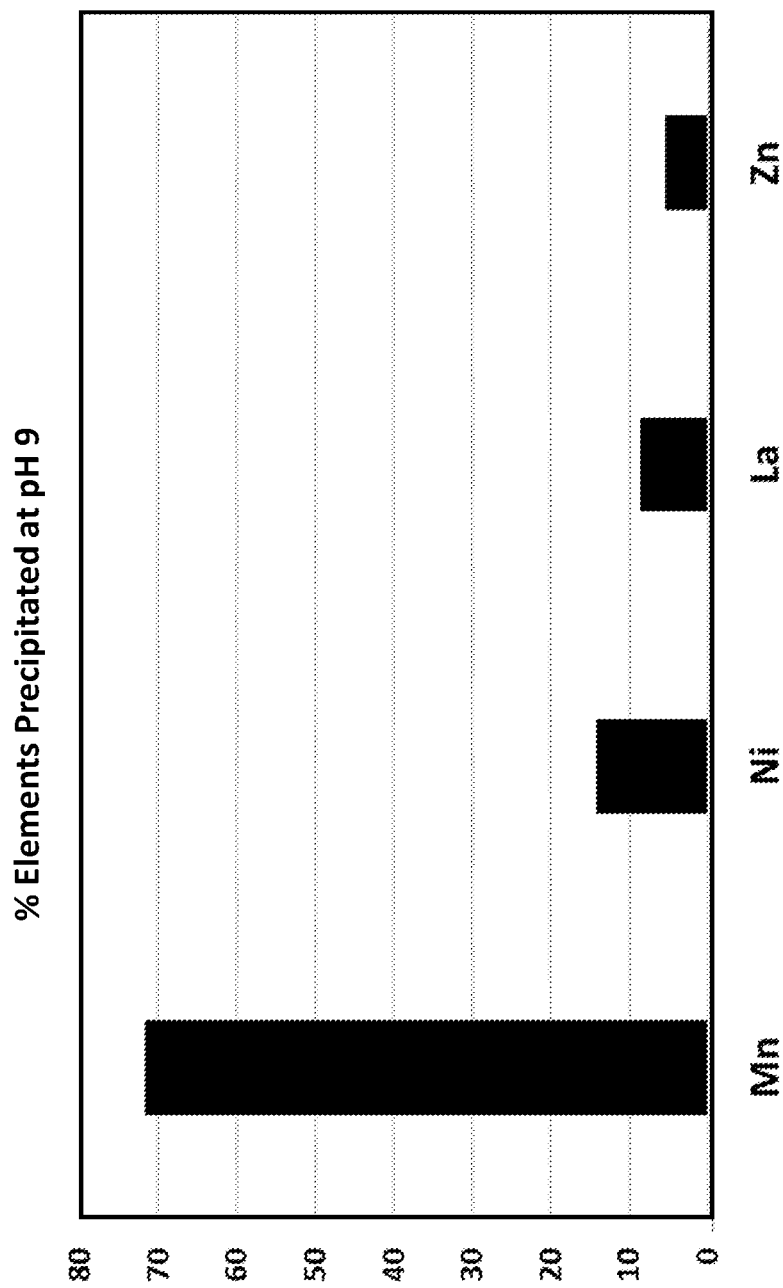
FIG. 26 is a chart depicting percent elements precipitated at pH 9 for class C ash feedstock.
Figure 27:
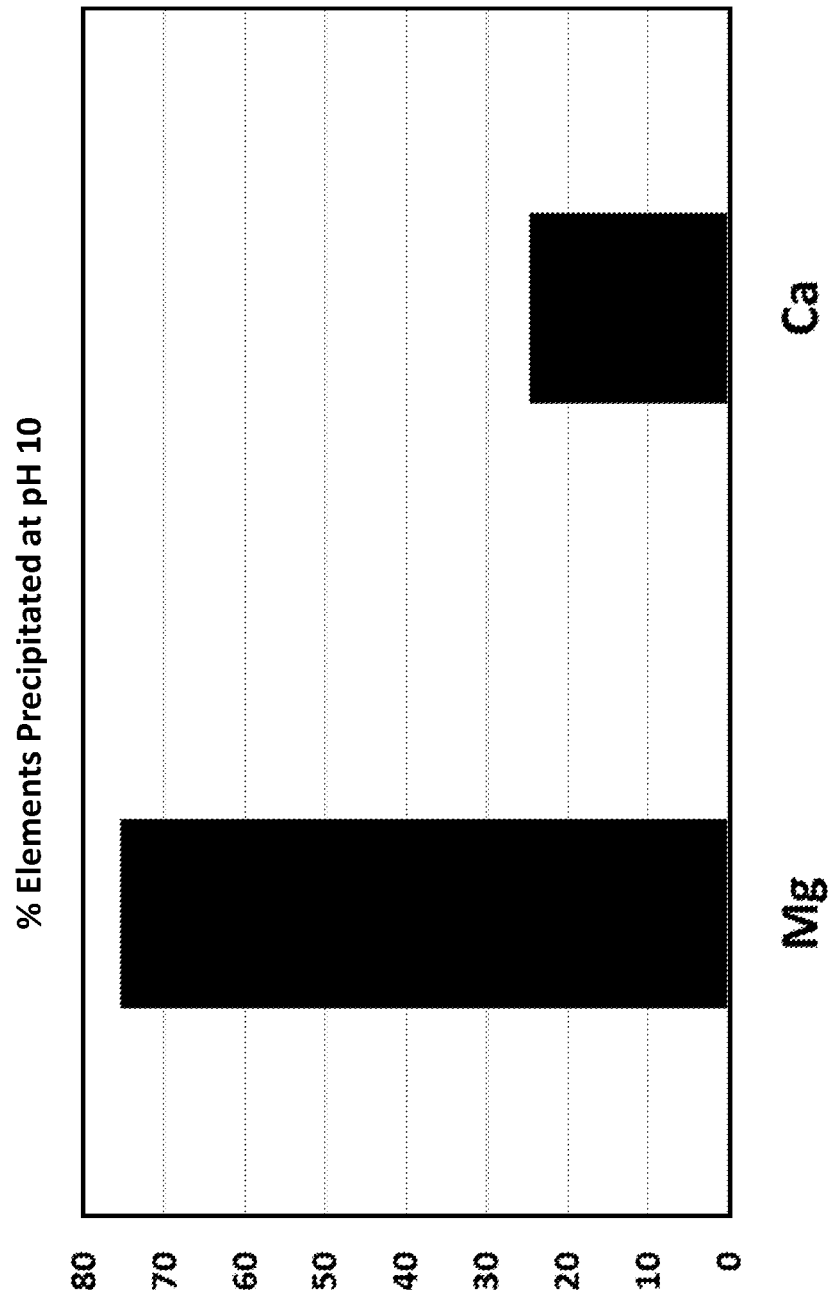
FIG. 27 is a chart depicting percent elements precipitated at pH 10 for class C ash feedstock.
Figure 28:
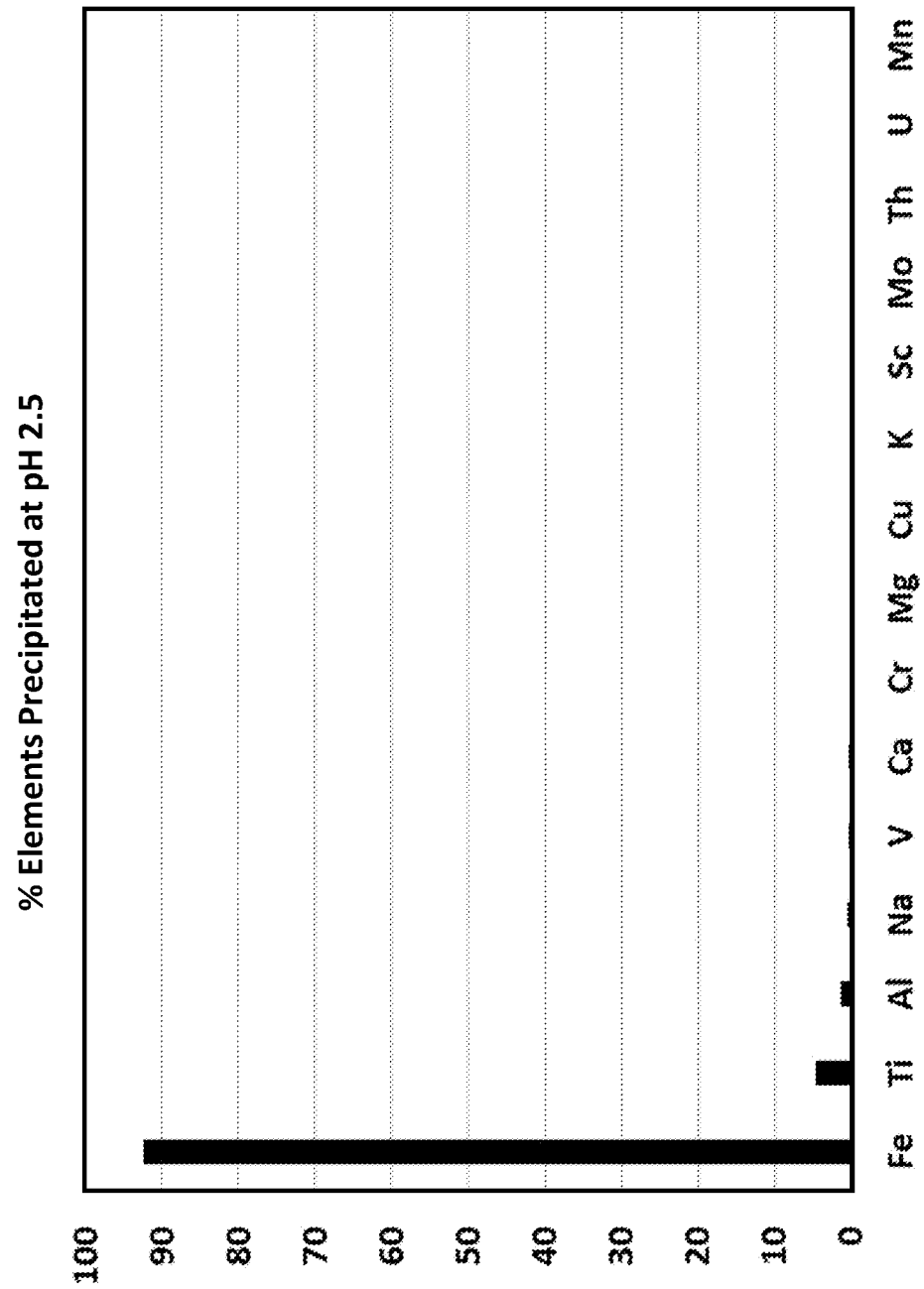
FIG. 28 is a chart depicting percent elements precipitated at pH 2.5 for class C ash feedstock.

FIGS. 22 through 28 depict the percent elements precipitated at each pH cut for class C ash feedstock. FIG. 22 depicts percent elements precipitated at pH 3. FIG. 23 depicts percent elements precipitated at pH 4. FIG. 24 depicts percent elements precipitated at pH 5-8. FIG. 25 depicts percent elements precipitated at pH 5-8 with aluminum removed to show the smaller percentages more clearly. FIG. 26 depicts percent elements precipitated at pH 9. FIG. 27 depicts percent element precipitated at pH 10. FIG. 28 depicts percent elements precipitated at pH 2.5. The iron purity shown precipitated at pH 3 can be improved to 92.5% by carrying out the precipitation at pH 2.5.

The percent element precipitated at pH 13 is >99% calcium. The remaining liquor is not a waste stream but a sodium chloride solution containing traces of strontium and barium. These can be precipitated with sodium carbonate to isolate high value products. The concentrations are 151 ppm strontium and 2 ppm barium. Since the solution is at pH 13, the excess hydroxide must be neutralized with HCl to pH 7 for the final product. The final product waste composition of the sodium chloride is shown in FIG. 29.

This final sodium chloride product is an important aspect of this disclosure which processes ash with minimal waste which differentiates it from previous attempts to separate products from CCP. For every 1 ton of ash feedstock this flowsheet generates 0.8 tons of NaCl. There is a market for this product as a solution or as a dried solid.

Figure 30:
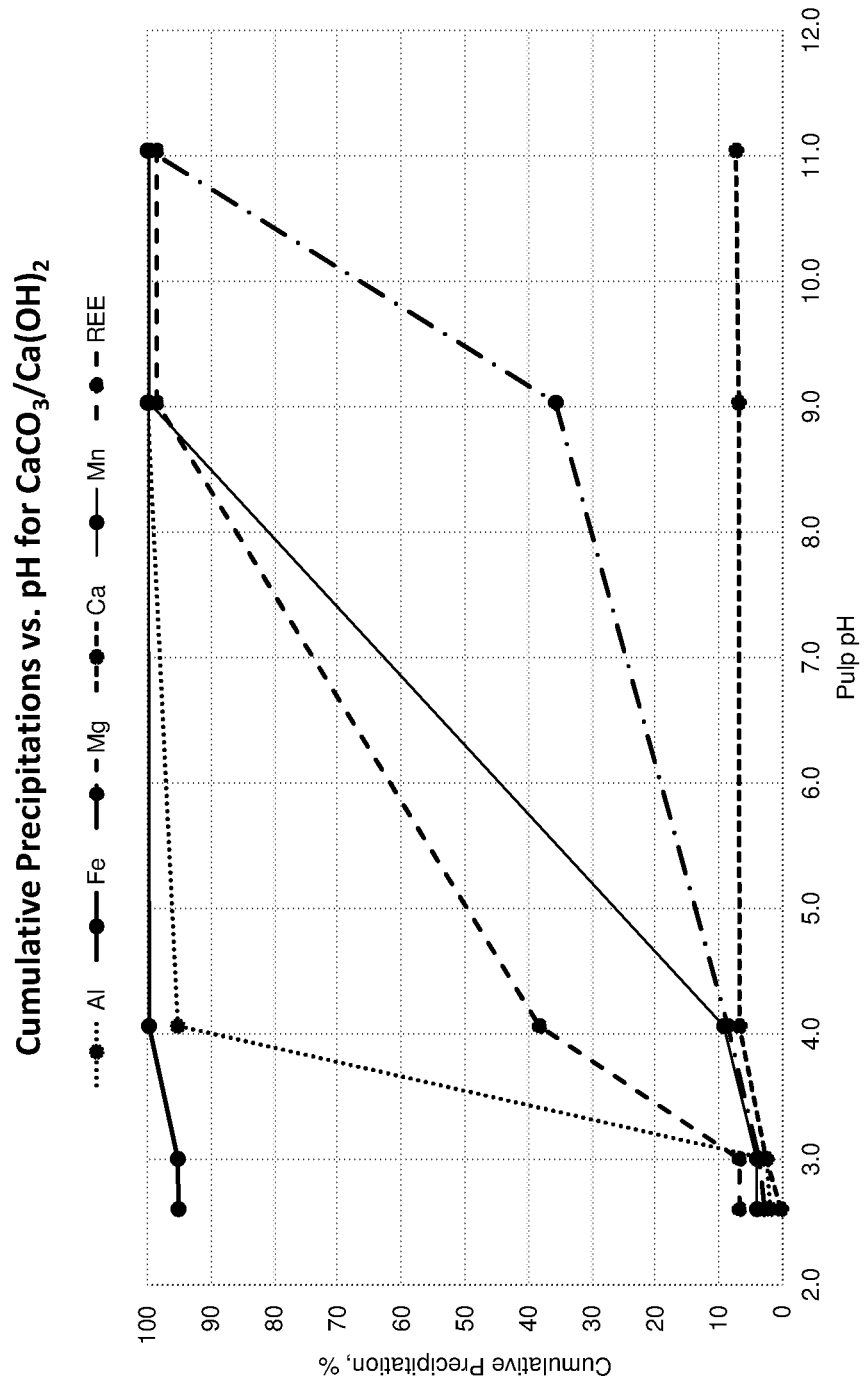
FIG. 30 is a chart depicting cumulative precipitations versus pH for calcium carbonate and calcium hydroxide for class C ash feedstock.

An alternative process embodiment is the use of calcium carbonate ($CaCO_3$) and calcium hydroxide ($Ca(OH)_2$) for the precipitation. Calcium carbonate can be used at the lower pHs up to pH 1 but then $Ca(OH)_2$ is used exclusively after that through the precipitation steps in the ash conversion process. FIG. 30 shows the precipitation as a function of pH for this reagent. FIG. 31 shows the elemental composition of all the precipitated products from $Ca(OH)_2$ precipitation testing.

In some embodiments of the caustic flowsheet, the final calcium precipitation is not performed, and the final product is a sodium chloride/calcium chloride blend.

Product Enhancement

Silica

In some embodiments, the residue after the leach process 111 (FIGS. 1 and 3) is silica which may comprise up to 20% impurities comprising primarily aluminum and carbon and occasionally barium in the test examples. In some embodiments, impurities may be removed by at least one of calcining, caustic fusion and filtration. Carbon impurities, for instance, may be removed by calcining at 600° C. or higher.

In preliminary testing, two methods of caustic fusion were found to be successful: the first was a 300° C. fusion with caustic while the other was a dissolution in 8M NaOH at 90° C. The first method dissolved 68% of the residue while the second yielded 62%. However, the 8M NaOH dissolved less aluminum than the caustic fusion process. The dissolution of the silica residue can be greatly increased using higher temperatures closer to 1000° C. up to 1200° C. Caustic may be sodium or potassium hydroxide.

The reactions are shown below:

$$2NaOH + SiO_2 \rightarrow Na SiO_3 + H_2O \tag{2}$$

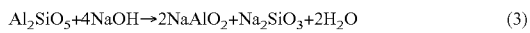

$$Al_2SiO_5 + 4NaOH \rightarrow 2NaAlO_2 + Na_2SiO_3 + 2H_2O \tag{3}$$

The sodium silicate formed from the fusion is dissolved in water and the mixture filtered to remove any insoluble impurities. In some embodiments, the solids may be recycled back to the front end of the process or to acid leaching (FIGS. 1 and 3, leach tank 110).

In some embodiments, the filtrate is treated with HCl to drop the pH to at least 1 and precipitate silicic acid ($H_4SiO_4$). In some embodiments, the silicic acid may be filtered and then calcined, or spray dried then calcined, to convert it a high purity (greater than 99%), high value amorphous silica powder. In some embodiments, the silica powder has a BET-N2 surface area of greater than 160 $m^2/g$ which has numerous applications as an additive in tires, elastomers, plastics, and rubber products.

$$H_4SiO_4 \text{ thermal decomposition to } SiO_2 + 2H_2O \tag{4}$$

In preliminary testing, a purity of 95.4% was obtained with the fusion product. In some embodiments, the filtrate is an acidic solution of sodium chloride containing some elements such as aluminum and may be recycled back to the precipitation start of the process (FIGS. 1 and 3, pH adjustment tank 120).

Another option is to add sodium hydroxide to pH 4 and precipitate aluminum hydroxide. The hydroxide is then calcined to the oxide product. The remaining liquor is sodium chloride product as in the caustic and lime flowsheets the (FIGS. 2 and 4).

Example Process Embodiments for Silica Processing

Figure 32:
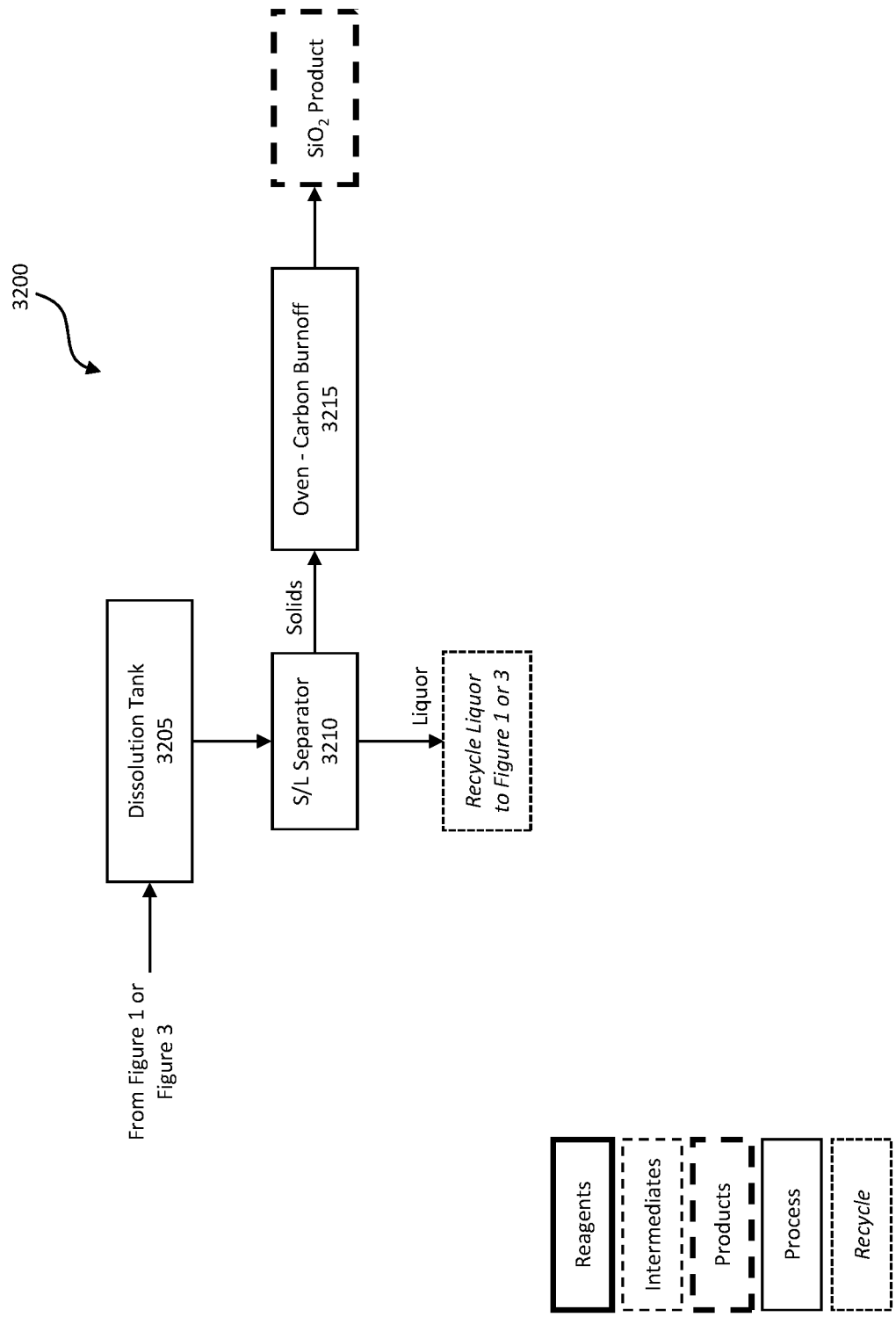
FIG. 32 depicts an optional process embodiment for refining a silica product.
Figure 33:
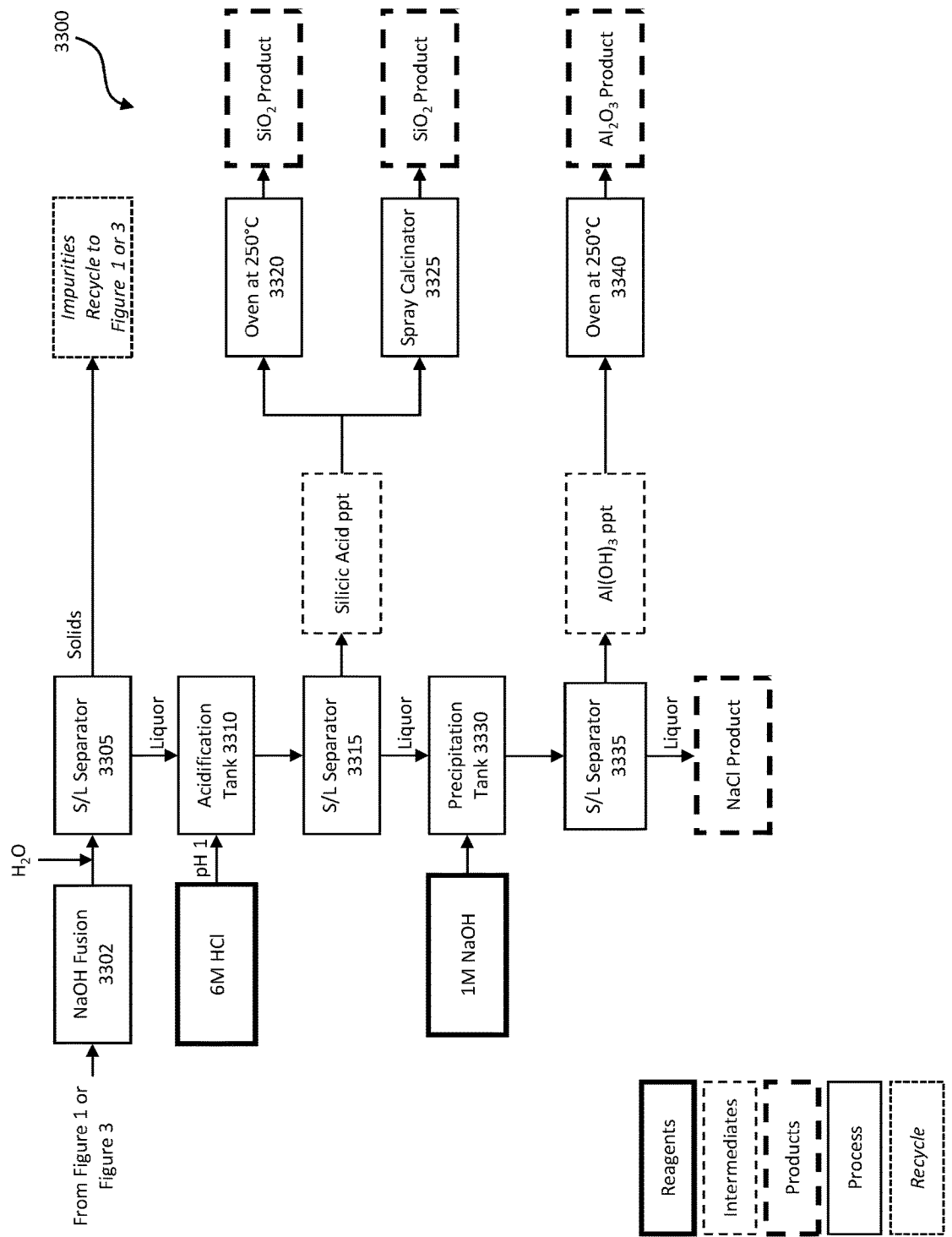
FIG. 33 depicts another optional process embodiment for refining a silica product.

FIGS. 32 and 33 depict two options for further processing of a silica product as optional continuations of FIGS. 1 and 3. FIG. 32 depicts an acid dissolution process 3200 and FIG. 33 depicts a sodium hydroxide fusion process 3300. In FIG. 32, residue silica and silicates from solid/liquid separation 115 (FIGS. 1 and 3) proceed to dissolution tank 3205. In some embodiments, 30% hydrochloric acid (HCl) is applied for 24 hours in dissolution tank 3205. Following acid dissolution in dissolution tank 3205, the liquor proceeds to solid/liquid separator 3210 resulting in solids and a liquor. In embodiments where the solids comprise carbon, the solids proceed to an oven 3215 for carbon burnoff. In some embodiments, the solids are heated in oven 3215 for 6 hours at a minimum of 600° C. resulting in a purified silica ($SiO_2$) product. The liquor from solid/liquid separator 3210 may be recycled to the pH adjustment tank 120 (FIGS. 1 and 3).

In FIG. 33, residue silica and silicates from solid/liquid separation 115 (FIGS. 1 and 3) proceed to sodium hydroxide (NaOH) fusion 3302 (at 300° C. in some embodiments). Potassium hydroxide may be used instead of NaOH, in some embodiments. Water is added to the fused material and the liquor proceeds to solid/liquid separation 3305. Solids may optionally proceed to the leach tank 110 (FIGS. 1 and 3) to recycle impurities, where impurities are dependent on the composition of the feedstock. The filtrate proceeds to acidification tank 3310 where acid, 6M HCl in the depicted embodiment, is added to reduce the pH to pH 1. The pH adjusted liquor proceeds to solid/liquid separation 3315. The solids are primarily silicic acid ($H_4SiO_4$) precipitate which may proceed to at least one of oven 3320, at 250° C. in the depicted embodiment, and spray calcination 3325 resulting in a high purity (greater than 99%) amorphous $SiO_2$ product. The $SiO_2$ product may be powdered, in some embodiments. Spray drying may preserve the small, submicron in some embodiments, particle size and prevent agglomeration. The liquor proceeds to precipitation tank 3330. In the depicted embodiment, 1M NaOH is added to the precipitation tank 3330 to raise pH above 7. The liquor proceeds to solid/liquid separation 3335. The solids are primarily aluminum hydroxide ($Al(OH)_3$) which may be marketed as-is or calcined in oven 3340, at 250° C. in the depicted embodiment, resulting in an alumina ($Al_2O_3$) product. The final liquor is sodium chloride (NaCl) which can be marketed as a product.

Material transfer between processes/equipment may be carried out with the use of pumps, etc.

Iron and Aluminum

Iron hydroxide is first precipitated together with scandium and other heavy elements. Aluminum hydroxide is precipitated next with some iron impurity and other minor elements. In some embodiments, the iron hydroxide and the aluminum hydroxide are both around 90% pure but are contaminated with a small amount of the other product. These products may be further purified by first dissolving them in excess NaOH at 90° C. The aluminum hydroxide dissolves to form a soluble aluminate which can then be separated from the iron hydroxide. After the solid-liquid separation, the aluminum can be reprecipitated by adding acid to get back to the insoluble hydroxide.

Manganese

In some embodiments, minor levels of manganese (0.02-0.03%) may be separately precipitated in either the caustic or the lime flowsheets at a pH of 9. The major impurity is magnesium.

Barium and Strontium

In some embodiment of the caustic flowsheet, after the calcium is precipitated as calcium hydroxide, sodium carbonate can be added to separate barium and strontium carbonates before the final liquor is neutralized to yield sodium chloride.

REEs and Transition Metals

In some embodiments, rare earth elements (REEs) and transition metals may be separated from each other using ion exchange, solvent extraction, adsorption, or a combination thereof. In some embodiments, the process may concentrate REEs and transition metals (also referred to as mischmetals) from 20 to 100-fold. Mischmetals are mixed metal alloys of rare-earth elements. Cerium mischmetal is a cerium rich misch and rare-earth mischmetal is rare earth rich. In some embodiments, rare-earth mischmetal comprises at least one of cerium, lanthanum, and neodymium. A typical composition includes approximately 55% cerium, 25% lanthanum, and 15-18% neodymium with other rare earth metals following. The mischmetals may be marketed as is to vendors specializing in separating these products or treated as a separate process.

Chlor-Alkali

A synergy exists between the process depicted in FIGS. 1 through 4 and a chlor-alkali plant. The sodium chloride product from FIGS. 2 and/or 4 could be used as feed to a chlor-alkali plant, and a discounted supply of hydrochloric acid could be used in one or more leaching steps and caustic used either directly, or with the addition of a carbon dioxide stream, as sodium carbonate.

Embodiment A

Some embodiments use the well-established technology of a chlor-alkali plant to convert sodium chloride rich final product from FIG. 2 and/or 4 to sodium hydroxide, hydrogen, and chlorine. Hydrogen and chlorine are then combined to produce HCl gas which is then dissolved in water to produce hydrochloric acid. By recycling the sodium chloride final process stream to replenish the starting reagent materials, hydrochloric acid and sodium hydroxide, a significant savings is achieved at the cost of capital investment in a chlor-alkali plant. In some embodiments, hydrochloric acid is used as the leaching agent in FIGS. 1 and/or 3 and sodium hydroxide can be used directly in the caustic flowsheet embodiment (FIGS. 3 and 4) or converted to sodium carbonate by bubbling $CO_2$ (exhaust gas from a fossil fuel power plant, in some embodiments) into sodium hydroxide to be used as a reagent to precipitate a $CaCO_3$ product in the lime flowsheet embodiment (FIGS. 1 and 2). In some embodiments, the $CaCO_3$ product is high purity (>99%).

Embodiment B

Some embodiments use a side stream from a fossil fuel plant gaseous discharge containing carbon dioxide ($CO_2$) to use directly in the process thereby saving a significant reagent cost in purchased $CO_2$ gas and at the same time achieving an environmental benefit by capturing a greenhouse gas into commercial products (carbonates).

One of the reactions used to capture the $CO_2$ is by absorbing it in sodium hydroxide from the chlor-alkali plant to form sodium carbonate, which is used as a process reagent, in some embodiments. The acid-base reaction is rapid and one of the ways the reaction can be monitored is by tracking the pH from the higher sodium hydroxide value to the lower sodium carbonate value, in some embodiments. This conversion can be done in a batch mode or a continuous mode through pipes with one or more $CO_2$ entry points to react with the caustic to quantitatively produce sodium carbonate and save the cost of another purchased reagent.

In some embodiments, $CO_2$ may be provided from other processes, plants, or sources. In some embodiments, naturally occurring or stored $CO_2$ may be pumped from underground formations. Any use of carbon dioxide could be beneficially used for carbon sequestration from a slip stream off of a coal power plant exhaust.

Mixed Ash and FGD Feedstock

Figure 34:
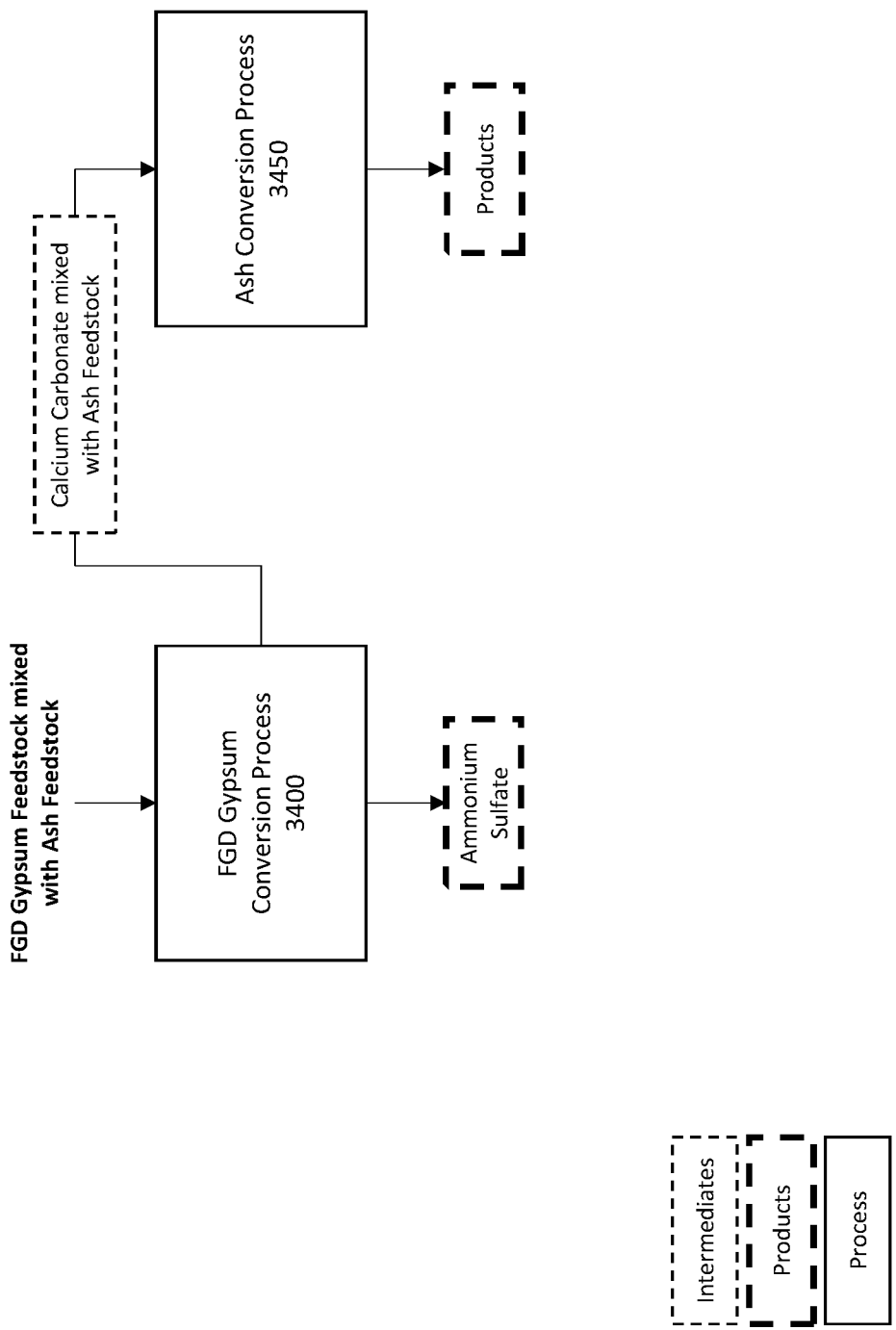
FIG. 34 depicts the ash conversion process used in conjunction with an FGD gypsum conversion process.

FIG. 34 depicts an ash conversion process 3450 combined with an FGD gypsum conversion process 3400. The FGD conversion process is disclosed in detail in U.S. patent application Ser. No. 16/749,860 entitled Systems and Methods to Treat Flue Gas Desulfurization Waste to Produce High Purity Ammonium Sulfate and Calcium Carbonate Products, filed Jan. 22, 2020, which is herein incorporated by reference in its entirety. The depicted ash conversion process 3450 may be the lime embodiment (FIGS. 1 and 2) or the caustic embodiment (FIGS. 3 and 4) or variations thereof as disclosed herein. In the depicted embodiment of the combined conversion system and method, FGD gypsum feedstock that is mixed with ash is processed in the FGD gypsum conversion process 3400 resulting in an ammonium sulfate product and a calcium carbonate product that is mixed with ash. The calcium carbonate product that is mixed with ash is processed through the ash conversion process 3450 resulting in the ash conversion process products as disclosed herein.

Process Control

In some embodiments, one or more processors may be used to control and manage one more aspects of the systems and methods disclosed herein.

Disclosed herein are systems and methods for processing a metal-bearing waste streams In some embodiments, the feedstock is a powder that comprises metal-bearing components and sulfur components. The feedstock may be loaded into a first reactor to begin processing. In some embodiments, a processor is configured to operate a processing sequence comprising at least one of a dissolution process and a precipitation process wherein the dissolution process and/or precipitation process take place in one or more reactors. The processor may be configured to perform one or more of the following steps: using a first dissolution process, wherein the first dissolution process comprises using a leach process performed by at least one of contacting, passing, and percolating an acid through the powder feedstock and collecting a leachate formed in a second reactor; responsive to collecting the leachate, use a sequential selective precipitation process at a predetermined pH to sequentially precipitate components, wherein a first predetermined pH is used to precipitate a first component from the leachate; responsive to precipitating the first component, separate by filtration the first component, and collect the first filtrate in at least one of the second reactor and a third reactor; responsive to collecting the first filtrate, use a base component to adjust the first filtrate to a second predetermined pH; using the sequential precipitation process at the second predetermined pH, precipitate a second component, separate by filtration the second component and generate a second filtrate; and using the sequential precipitation process to separate additional components based on the predetermined pHs of the component of interest. The steps may be performed in orders other than the order presented herein and additional or fewer steps may be performed. In some embodiments, the processor is configured to use to use a predetermined pH to separate components from the leachate based on predetermined logic.

Non-Transistory Computer Readable Medium

The systems and methods described above can use dedicated processor systems, micro controllers, programmable logic devices, or microprocessors that perform some or all of the communication operations. Some of the operations described above may be implemented in software and other operations may be implemented in hardware.

The various operations of methods described above may be performed by any suitable means capable of performing the operations, such as various hardware and/or software component(s), circuits, and/or module(s).

The various illustrative logical blocks, modules, and circuits described in connection with the present disclosure may be implemented or performed with a hardware processor, a digital signal processor (DSP), an application specific integrated circuit (ASIC), a field programmable gate array signal (FPGA) or other programmable logic device (PLD), discrete gate or transistor logic, discrete hardware components, or combinations thereof designed to perform the functions described herein. A hardware processor may be a microprocessor, commercially available processor, controller, microcontroller, or state machine. A processor may also be implemented as a combination of two computing components, e.g., a combination of a DSP and a microprocessor, a plurality of microprocessors, one or more microprocessors in conjunction with a DSP core, or any other such configuration.

In one or more aspects, the functions described may be implemented in software, firmware, or any combination thereof executing on a hardware processor. If implemented in software, the functions may be stored as one or more executable instructions or code on a non-transitory computer-readable storage medium. A computer-readable storage media may be any available media that can be accessed by a processor. By way of example, and not limitation, such computer-readable storage media can comprise RAM, ROM, EEPROM, CD-ROM or other optical disk storage, magnetic disk storage or other magnetic storage devices, or any other medium that can be used to store executable instructions or other program code or data structures and that can be accessed by a processor. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims. Processes or steps described in one implementation can be suitably combined with steps of other described implementations.

Certain aspects of the present disclosure may comprise a computer program product for performing the operations presented herein. For example, such a computer program product may comprise a computer readable storage medium having instructions stored (and/or encoded) thereon, the instructions being executable by one or more processors to perform the operations described herein.

Software or instructions may be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a terminal and/or base station can obtain the various methods upon coupling or providing the storage means to the device.

For the sake of convenience, the operations are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or described features can be implemented by themselves, or in combination with other operations in either hardware or software.

To facilitate the understanding of the embodiments described herein, a number of terms are defined below. The terms defined herein have meanings as commonly understood by a person of ordinary skill in the relevant art. Terms such as "a," "an," and "the" are not intended to refer to only a singular entity, but rather include the general class of which a specific example may be used for illustration. The terminology herein is used to describe specific embodiments, but their usage does not delimit the disclosure, except as set forth in the claims.

Batch Process: A batch process operates in separate discrete operations that are connected in a stepwise fashion with the materials processed being fed in batches.

Continuous Process: A continuous process is designed to operate without interruptions. The materials being processed, either bulk dry or fluids, are continuously in motion undergoing chemical reactions, or subject to mechanical or heat treatment.

Rare Earth Elements (REEs): REEs are any of a group of chemically similar metallic elements comprising the lanthanide series and (usually) scandium and yttrium.

Transition Elements: Transition elements are any of the set of metallic elements occupying a central block (Groups IVB-VIII, IB, and IIB, or 4-12) in the periodic table, e g , manganese, chromium, and copper.

Having described and illustrated the principles of the systems, methods, processes, and/or apparatuses disclosed herein in a preferred embodiment thereof, it should be apparent that the systems, methods, processes, and/or apparatuses may be modified in arrangement and detail without departing from such principles. Claim is made to all modifications and variation coming within the spirit and scope of the following claims.

What is claimed is:

1. A method for processing a metal-bearing waste stream, the method comprising:
    loading a powder feedstock into a first reactor, wherein the powder feedstock comprises at least one of a metal-bearing component and a sulfur bearing component;
    configure a processor to operate a processing sequence comprising at least one of a dissolution process and a precipitation process in one or more reactors, including the steps of:
        using a first dissolution process, wherein the first dissolution process comprises using a leach process performed by at least one of contacting, passing, and percolating an acid through the powder feedstock and collecting a leachate formed in a second reactor,
        responsive to collecting the leachate, use a sequential selective precipitation process at a predetermined pH to sequentially precipitate components, wherein a first predetermined pH is used to precipitate a first component from the leachate,
        responsive to precipitating the first component, separate by filtration the first component, and collect the first filtrate in at least one of the second reactor and a third reactor,
        responsive to collecting the first filtrate, use a base component to adjust the first filtrate to a second predetermined pH,
        using the sequential precipitation process at the second predetermined pH, precipitate a second component, separate by filtration the second component and generate a second filtrate, and
        using the sequential precipitation process to separate additional components based on the predetermined pHs of the component of interest.

2. The method of claim 1, wherein the processor is configured to use a predetermined pH to separate components from the leachate based on predetermined logic.

3. The method of claim 1, wherein the dissolution process is performed in one or more stages.

4. The method of claim 1, wherein the acid comprises one or more different acids, and wherein the different acids are at one or more different concentrations.

5. The method of claim 1, wherein the base component is at least one of calcium hydroxide, sodium hydroxide, potassium hydroxide, and ammonium hydroxide.

6. The method of claim 1, wherein the sequentially precipitated components are hydroxides of at least one of iron, aluminum, magnesium, and calcium.

7. The method of claim 1, wherein the sequentially precipitated components include at least one of a mischmetal, wherein the mischmetal is a mixed metal alloy of rare-earth elements and wherein the mischmetal is at least one of a cerium mischmetal, a rare-earth mischmetal, wherein the rare-earth mischmetal comprises at least one of cerium, lanthanum, and neodymium.

8. A system for processing a metal-bearing waste stream, the system comprising:
    powder feedstock loaded into a first reactor, wherein the powder feedstock comprises at least one of a metal-bearing component and a sulfur bearing component;

a processor configured to operate a processing sequence comprising at least one of a dissolution process and a precipitation process in one or more reactors, including the steps of:
- using a first dissolution process, wherein the first dissolution process comprises using a leach process performed by at least one of contacting, passing, and percolating an acid through the powder feedstock and collecting a leachate formed in a second reactor,
- responsive to collecting the leachate, use a sequential selective precipitation process at a predetermined pH to sequentially precipitate components, wherein a first predetermined pH is used to precipitate a first component from the leachate,
- responsive to precipitating the first component, separate by filtration the first component, and collect the first filtrate in at least one of the second reactor and a third reactor,
- responsive to collecting the first filtrate, use a base component to adjust the first filtrate to a second predetermined pH,
- using the sequential precipitation process at the second predetermined pH, precipitate a second component, separate by filtration the second component and generate a second filtrate, and
- using the sequential precipitation process to separate additional components based on the predetermined pHs of the component of interest.

9. The system of claim 8, wherein the processor is configured to use a predetermined pH to separate components from the leachate based on predetermined logic.

10. The system of claim 8, wherein the dissolution process is performed in one or more stages.

11. The system of claim 8, wherein the acid comprises one or more different acids, and wherein the different acids are at one or more different concentrations.

12. The system of claim 8, wherein the base component is at least one of calcium hydroxide, sodium hydroxide, potassium hydroxide, and ammonium hydroxide.

13. The system of claim 8, wherein the sequentially precipitated components are hydroxides of at least one of iron, aluminum, magnesium, and calcium.

14. The system of claim 8, wherein the sequentially precipitated components include at least one of a mischmetal, wherein the mischmetal is a mixed metal alloy of rare-earth elements and wherein the mischmetal is at least one of a cerium mischmetal, a rare-earth mischmetal, wherein the rare-earth mischmetal comprises at least one of cerium, lanthanum, and neodymium.

* * * * *